(12) United States Patent
Medin

(10) Patent No.: US 7,529,856 B2
(45) Date of Patent: May 5, 2009

(54) DELIVERING MULTIMEDIA SERVICES

(75) Inventor: Milo S. Medin, Redwood City, CA (US)

(73) Assignee: At Home Corporation, San Mateo, CA (US)

( * ) Notice: Subject to any disclaimer, the term of this patent is extended or adjusted under 35 U.S.C. 154(b) by 0 days.

(21) Appl. No.: 11/735,925

(22) Filed: Apr. 16, 2007

(65) Prior Publication Data

US 2007/0183441 A1 Aug. 9, 2007

Related U.S. Application Data

(63) Continuation of application No. 10/777,912, filed on Feb. 11, 2004, now Pat. No. 7,225,275, which is a continuation of application No. 09/427,778, filed on Oct. 26, 1999, now Pat. No. 6,732,179, which is a continuation-in-part of application No. 08/811,586, filed on Mar. 5, 1997, now Pat. No. 6,370,571.

(51) Int. Cl.
| | |
|---|---|
| G06F 15/16 | (2006.01) |
| H04N 7/10 | (2006.01) |
| H04N 7/16 | (2006.01) |
| H04L 12/28 | (2006.01) |
| G06F 15/173 | (2006.01) |

(52) U.S. Cl. .................. 709/249; 370/390; 725/35; 725/148

(58) Field of Classification Search ................ 709/245, 709/246, 249; 370/270, 352, 389–390; 725/32–36, 725/135–153
See application file for complete search history.

(56) References Cited

U.S. PATENT DOCUMENTS

| | | | |
|---|---|---|---|
| 3,789,137 | A | 1/1974 | Newell |
| 4,173,014 | A | 10/1979 | Leighou et al. |
| 4,429,332 | A | 1/1984 | Pargee, Jr. |
| 4,538,176 | A | 8/1985 | Nakajima et al. |
| 4,814,883 | A | 3/1989 | Perine et al. |
| 5,093,718 | A | 3/1992 | Hoarty et al. |
| 5,446,490 | A | 8/1995 | Blahut et al. |
| 5,512,935 | A | 4/1996 | Majet et al. |
| 5,519,698 | A | 5/1996 | Lyles et al. |
| 5,532,735 | A | 7/1996 | Blahut et al. |
| 5,539,449 | A | 7/1996 | Blahut et al. |

(Continued)

OTHER PUBLICATIONS

@Home Frequently Asked Questions, became aware of reference on Jul. 13, 2003.

(Continued)

*Primary Examiner*—George C Neurauter, Jr.
(74) *Attorney, Agent, or Firm*—Fenwick & West LLP

(57) ABSTRACT

Disclosed is a scalable, hierarchical, distributed network architecture and processes for the delivery of high-performance, end-to-end online multimedia services, including Internet services such as World Wide Web access. The network architecture connects a high-speed private backbone to multiple network access points of the Internet, to a network operation center, to a back office system, and to multiple regional servers in regional data centers. Each of the regional servers connects to several caching servers in modified headends, which in turn connect via fiber optics to many neighborhood nodes. Finally, each node connects via coaxial cable to multiple end-user systems. The processes include those for replicating and caching frequently-accessed content, and multicasting content customized per region or locality.

17 Claims, 13 Drawing Sheets

U.S. PATENT DOCUMENTS

| | | | |
|---|---|---|---|
| 5,550,577 | A | 8/1996 | Verbiest et al. |
| 5,682,195 | A | 10/1997 | Hendricks et al. |
| 5,745,837 | A | 4/1998 | Fuhrmann |
| 5,761,606 | A | 6/1998 | Wolzien |
| 5,787,470 | A | 7/1998 | DeSimone et al. |
| 5,787,483 | A | 7/1998 | Jam et al. |
| 5,790,541 | A | 8/1998 | Patrick et al. |
| 5,790,806 | A | 8/1998 | Koperda |
| 5,835,087 | A | 11/1998 | Herz et al. |
| 5,847,751 | A | 12/1998 | Safadi |
| 5,850,218 | A | 12/1998 | LaJoie et al. |
| 5,892,535 | A | 4/1999 | Allen et al. |
| 5,991,306 | A | 11/1999 | Burns et al. |
| 6,101,180 | A | 8/2000 | Donahue et al. |
| 6,138,141 | A | 10/2000 | DeSimone et al. |
| 6,201,536 | B1 | 3/2001 | Hendricks et al. |
| 6,493,876 | B1 | 12/2002 | DeFreese et al. |
| 6,553,178 | B2 | 4/2003 | Abecassis |
| 6,738,978 | B1 | 5/2004 | Hendricks et al. |
| 6,772,443 | B2 | 8/2004 | LaJoie et al. |
| 7,225,275 | B2 * | 5/2007 | Medin ......................... 709/249 |

OTHER PUBLICATIONS

"@Home And Netscape Announce Strategic Relationship To Define Cable-Based Internet Services To The Home," Network Press Release 1995, pp. 1-3.

"Automotive Industry Will Seek Internet Service Provider Certification," The Cook Report On Internet, vol. IV, No. 11, Feb. 1996, pp. 1-24.

"Cable Modem Termination System—Network Side Interface Specification," MCNS Holdings, L.P., Data Over Cable Interface Specifications, SP-CTMS-NSII01-960702, 17 pages, [online] Retrieved from the Internet: <URL: http://www.cablemodem.com/downloads/specs/SP_CMTS_NSII01-96072.pdf>.

"Cable Modems and the Future of Broadband," High-Speed Networking Newsletter, Section: No. 10, vol. 4, Jan. 1, 1996, pp. 1-2.

"Defendant AT&T Corp.'s Preliminary Invalidity Contentions," Case No. C 02 5442 SI, United States District Court of Northern California, San Francisco Division, Richard A. Williamson, on behalf of and as trustee for the Bondholders' Liquidating Trust of At Home Corporation, and on behalf of and in the name of At Home Liquidating Trust of *At Home Corporation* vs. *AT&T Corporation*, Jul. 31, 2003, 580 pages.

"Macromedia And @Home Demonstrate High Bandwidth Multimedia On The Web; Companies Announce Cooperation On Tools And Technology," PR Newswire, Nov. 29, 1995, pp. 1-3.

"Multicasting in an ATM Network," ntrg.cs.tcd.ie/undergrad/4ba2/multicast/leon/retrieved from the Internet Aug. 22, 2005.

"Router amd Switch Request For Proposal," @Home Engineering (DVE &DSM), Dec. 20, 1995.

"Skyconnect to Market Digital's Mediaplex ad Insertion Systems With Comprehensive ad Fulfillment Service," PR Newswire, Dec. 19, 1995, pp. 1-2.

"The Future of the Internet," The Cook Report On Internet, Jan. 11-12, 1996, pp. 1-4.

Abrams, M. et al., "Caching Proxies: Limitations And Potentials," 4th International World Wide Web Conference, Boston, USA, Oct. 7, 1975, pp. 119-133.

Allen, J. et al. "VCTV: A Video-On-Demand Market Test," AT&T Technical Journal, Jan./Feb. 1993, pp. 7-14.

Almeroth, K. C. et al., "On the Performance of a Multicast Delivery Video-On-Demand Service with Discontinuous VCR Actions," Sep. 7, 1994.

Almeroth, K.C. et al., "The Role Of Multicast Communication In The Provision Of Scalable And Interactive Video-On-Demand Service," IEEE Journal on Selected Areas in Communications, 14(6), Aug. 1996, 1110-1122.

Amir, E. et al., "An Application Level Video Gateway," ACM Multimedia Conf., San Francisco, CA, Nov. 1995, pp. 255-265.

Amir, Y. et al., "Robust And Efficient Replication Using Group Communication," Technical Report CS94-20, The Hebrew University of Jerusalem, Nov. 1994, pp. 1-18.

Barber, S., "Data Over Cable And The @Home Network," @Home Network, Feb. 1996, [Retrieved from the Internet], <http://www.academ.com/nanog/feb1996/data.over.cable.html.>, pp. 1-4.

Berwick, Robert C. et al., "Research Priorities for the World-Wide Web," Report of the NSF Workshop Sponsored by the Information, Robotics, and Intelligent Systems Division, Arlington, VA, Oct. 31, 1994, pp. 1-43.

Bestavros, A., "Demand-based Data Dissemination in Distributed Multimedia Systems," In Proceedings of ACM/IASTED/ISMM Conference on Distributed Multimedia Systems and Applications, Stanford, CA, 1995, 4 pages.

Blahut, T. et al., "The AT&T Interactive Consumer Video Services Platform," 1st International Workshop on Community Networking Multiple, Jul. 13-14, 1994, pp. 1-10.

Blank, Christine, "The FSN Challenge: Large-Scale Interactive Television," IEEE Computer Society, May 1995, pp. 9-13.

Bourne, J. et al. "Implementing The Information Highway," Telesis, Section: vol. 29, No. 6, May 1994, pp. 4-25.

Bowman, C. Mic et al., "Harvest: A Scalable, Customizable Discovery And Access System," Technical Report CU-CS-732-94, Department of Computer Science, University of Colorado, Boulder, Aug. 4, 1994, pp. 1-27.

Bowman, C. Mic et al., "Scalable Internet Resource Discovery: Research Problems And Approaches," Communications of the ACM, vol. 37, No. 2, Aug. 1994, pp. 98-114.

Bowman, C. Mic et al., "The Harvest Information Discovery and Access System," Computer Networks and ISDN Systems, 28(1-2), Dec. 1995, pp. 119-125.

Carhart, T.W., "Cable Modem Mania is Beginning To Build—Deploying a Broadband Data Service," Communication Engineering and Design, Mar. 1996, pp. 1-6.

Casner, S., "Frequently Asked Questions (FAQ) On The Multicast Backbone (MBONE)," May 1993, [Retrieved from the Internet] Retrieved on Aug. 1, 2003, http://www-mice.cs.ucl.ac.uk/multimedia/projects/mice/faq.html pp. 1-11.

Chankhunthod, A. et al., "A Hierarchical Internet Object Cache," Proceedings of the USENIX 1996 Annual Technical Conference, San Diego, CA—Jan. 1996, pp. 153-163.

Chueng, Shun Yan et al., "On The Use Of Destination Set Grouping To Improve Fairness in Multicast Video Distribution," Tech Report GIT-CC-95-25, Jul. 18, 1995, pp. 1-22.

Clark, R. et a., "Providing Scalable Web Services Using Multicast Communication," IEEE Workshop on Services in Distributed and Networked Environments—Jun. 1995, pp. 1-27.

Dail, J. et al., "Adaptive Digital Access Protocol: A MAC Protocol for Multiservice Broadband Access Networks," IEEE Communications, vol. 34, No. 3, Mar. 1996, pp. 104-112.

Danzig, P. et al., "A Case for Caching File Objects Inside Internetworks," Technical Report CU-CS-642-93—Department of Computer Science, University of Colorado, Boulder, CO, 1993, pp. 1-15.

Danzig, P. et al., "Massively Replicating Services In Wide-Area Internetworks," Technical Report, Computer Science Department, University of Southern California, 1994, pp. 1-13.

De Zhong, W. et al., "A Copy Network With Shared Buffers For Large-Scale Multicast ATM Switching," IEEE/ACM Transactions on Networking, vol. 1, No. 2, Apr. 1993, pp. 157-165.

DevEdge, Online, Archive Documentation Spring 1996—Dec. 1997, [Retrieved from the Internet] Retrieved on Aug. 1, 2003; <http://developer.netscape.com/docs/?cp=dev01tdoc>, pp. 1-3.

Doar, J.M.S., "Multicast in The Asynchronous Transfer Mode Environment," Ph. D. Thesis. University of Cambridge, Jan. 1993, pp. i-xvi and 1-168.

Donnelley, J. "WWW Media Distribution Via Hopwise Reliable Multicast," In Electronic Proceedings of the 3rd International World Wide Web Conference, Darmstadt, Germany, Apr. 10-13, 1995, pp. 1-13.

Duberman, D., Daily Spectrum: Interactive Media & Online Developer News, Jan. 23, 1996, pp. 1-7.

Dubey, S. et al., "A Movie-Scheduling Policy For Video-On-Demand Systems," Computer Science Department, University of Central Florida; Computer Technology Institute, Patras, Greece, became aware of reference on Jul. 13, 2003.

Ellis, Caron Schwartz "Cable Modem Speeds Accented At Calif. Show," Boulder County Business Report, 1996, 3 pages.

Federighi, Craig et al., "A Distributed Hierarchical Storage Manager for a Video-On-Demand System," Computer Science Division—EECS, University of California, Berkeley, 1994, pp. 1-11.

Floyd, Sally et al. "A Reliable Multicast Framework for Light-weight Sessions and Application Level Framing," Proceedings of SIGCOMM '95, Cambridge, MA, 1995, pp. 1-24.

Glider, G., "ISDN vs. Cable Modems," Jan. 26, 1996, p. 1.

Glider, G., "Telecom: Goliath at Bay," Forbes, Feb. 1996, pp. 100-117.

Gillett, Sharon, "Connecting Homes To The Internet: An Engineering Cost Model Of Cable vs. ISDN," Laboratory for Computer Science, Massachusettes Institute of Technology, Technical Report 654, 1995, pp. 1-197.

Golding, R. A. "A Weak-Consistency Architecture For Distributed Information Services," Computing Systems, 5(4) (UCSC-CRL-92-31), 1992, pp. 1-16.

Golding, R. A. "Modeling Replica Divergence In A Weak-Consistency Protocol For Global-Scale Distributed Data Bases," Technical Report UCSC-CRL-93-09, UC Santa Cruz, Feb. 1993, pp. 1-15.

Golding ,R. A., "Weak-Consistency Group Communication And Membership," Technical Report UCSC-CRL-92-52, Ph.D. thesis, UC Santa Cruz, Dec. 1992, pp. i-viii and 1-154.

Gova, A., "@Home With Will Hearst," Red Herring Magazine, Nov. 1995, pp. 1-5.

Gwertzman, J. "Autonomous Replication in Wide-Area Internetworks," Technical Report TR-17-95, Center for Research on Computing Technology, Harvard University, Cambridge, MA, Apr. 1995, pp. 1-100.

Gwertzman, J. and et al, "The Case for Geographical Push-Caching" Proceedings of the Fifth Workshop on Hot Topics in Operating Systems (HotOS-V) HOTOS95, May 1995, pp. 51-55.

Gwertzman, J. et al., "World-Wide Web Cache Consistency," In Proceedings of USENIX Symposium on Internetworking Technologies and Systems, 1996, pp. 141-152.

Haar, S.V., "Time Warner To Offer High-Speed Net Access," Newsbytes, Dec. 7, 1995, pp. 1-2.

Hamilton, M. "Multicast Approaches To World-Wide Web Caching," Technical Report LUT CS-TR 988, Department of Computer Studies, Loughborough University of Technology, United Kingdom, Aug. 1995, pp. 1-19.

Hanawa, T. et al., "MINC: Multistage Interconnection Network With Cache Control Mechanism," Parallel and Distributed Computing Systems (PDCS)'96, Sep. 1996, pp. 310-317.

Hardy, D. et al., "Effective Use Of Internet Information", Harvest User's Manual, Technical Report CU-CS-743-94, Version 1.3, University of Colorado at Boulder, Sep. 7, 1995, pp. i-v and 1-87.

Hearst III, W., Netscape Developer Conference, Keynote Address, Mar. 7, 1996, pp. 1-12.

Holbrock, H. et al., "Log-Based Receiver-Reliable Multicast For Distributed Interactive Simulation," Proc. ACM Sigcomm95, pp. 342-356, Boston, MA, Aug. 1995.

Jacobson, V., "How to Kill the Internet," SIGCOMM'95 Middleware Workshop, Cambridge, MA, Aug. 28, 1995, pp. 1-13.

Jadav, D. et al. "Design Issues In High Performance Media-On Demand Servers," Case Center Technical Report #9503, Case Center at Syracuse University, Feb. 1995, pp. 1-18.

Jeffery, C. et al., "Proxy-Sharing Proxy Servers," IEEE ETA-COM Conf., Portland, Oregon, May 1996, pp. 1-4.

Johnson, T. et al., "Two Approaches For High Concurrency In Multicast-Based Object Replication," Technical Report 94-041, Department of Computer and Information Sciences, University of Florida, 1994, pp. 1-58.

Kalva, H. et al., "Techniques For Improving The Capacity Of Video-On Demand Systems," 29th Hawaii International Conference on System Sciences (HICSS), vol. 2: Decision Support and Knowledge-Based Systems, Maui, Hawaii, Jan. 3-6, 1996, 8 pages.

Kelly, Mary Sydney, "Cable Niche Makes SkyConnect A Contender," Boulder County Business Report, Jun. 1997, 2 pages.

Klemets, Anders, "The Design and Implementation of a Media on Demand System for WWW," In Proc. 1st International Conference on the WorldWide Web, Geneva, Switzerland, 1994, 9 pages.

Knight, G. et al., "A Data Telecommunications Gateway Between The Internet And ISDN," Data and Telecom. ISDN Gateway, INET'95, 1995, 10 pages.

Korkea-aho, M., "Scalability In Distributed Multimedia Systems," Master's Thesis, Helsinki University of Technology, Laboratory of Information Processsing Science, Nov. 5, 1995, pp. 1-95.

Lai, Y.C. et al., "A Hierarchical Network Storage Architecture For Video-On-Demand Services," Proceedings of IEEE 21st Conference on Local Computer Networks, Oct. 1996, 9 pages.

Lee, Y.B. et al., "VIOLA: Video on Local-Area-Networks," In Proc. 2nd ISMM/IASTED Int. Conf. Multimedia Systems and Applications, Stanford University, Stanford, CA, Aug. 1995, pp. 1-16.

Lemberg, H., IETF 1995 Archives, Broadband '96 IEEE Workshop, Tucson, AZ, Jan. 2, 1996-Jan. 5, 1996, NETSYS.COM, Dec. 21, 1995, pp. 1-8.

Little, T.D.C. et al., "Prospects for Interactive Video-on-Demand," Multimedia Communications Laboratory—Department of Electrical, Computer and Systems Engineering—Boston University, Boston, MA 02215—In IEEE Multimedia, vol. 1, No. 3, Fall 1994, pp. 14-24.

López-Ortiz et al., "A Multicollaborative Push-Caching HTTP Protocol For The WWW," In Proceedings of the Fifth International World Wide Web Conference—Paris, France, May 1996 (also available as Technical Report CS-96-12, Dept. of Computer Science, University of Waterloo), pp. 13.

Lou, W. et al., "The Effect Of Multicasting and Multiple Media Object Types On Parallel and Merging Storage Strategies," Georgia Institute of Technology, CC Technical Report, GIT-CC-95-24, 1995, pp. 1-20.

Luotonen, A. et al., "World-Wide Web Proxies," Computer Networks and ISDN Systems, vol. 27, No. 2, Apr. 1994, pp. 147-154.

Malpani, R. et al., "Making World Wide Web Caching Servers Cooperate," 4th International WWW Conference, Boston, MA, 1995, pp. 1-12.

Maxemchuk, N. et al., "Voice and Data on a CATV Network," IEEE Journal on Selected Areas in Communications, vol. SAC-3, No. 2, Mar. 1985, pp. 300-311.

McDonnell, Patrick, "AT&T Breaks Speed Barrier," Computers & Electronics, vol. 22, No. 9, Sep. 1984, 6 pages.

McManus N. et al., "Cable Plunges Into The Internet"; Digital Media, Dec. 18, 1995, pp. 1-7.

Medin, Milo, "Transforming The Net With Broadband Cable Data," Smart Valley Talk, Feb. 1996, pp. 1-3.

Muntz, D. et al., "Multi-Level Caching in Distributed File Systems or Your Cache Ain't Nuthin' But Trash," in Proceedings of the 1992 Winter USENIX Conference, 1992, pp. 305-313.

Muntz, D. et al., "Multi-Level Caching In Distributed File," CITI Technical Report 91-3, University of Michigan, Ann Arbor, Center for IT Integration, Aug. 1991, pp. 1-6.

Nellas, V. et al., "Internet Provision Over ATM Infrastructure To Residential Users. A DAVIC Compliant Approach," Network and Optical Communications 96 (NOC'96) vol. II, Jun. 1996, pp. 199-205.

Nussbaumer, J.P. et al., "Networking Requirements For Interactive Video On Demand," IEEE Journal on Selected Areas in Communications, vol. 13(5), 1955, pp. 1-23.

O'Callaghan, Daniel, "A Central Caching Proxy Server For WWW Users At The University Of Melbourne," First Australian World-wide Web Conference, University of Melbourne, Australia, 1995, pp. 1-8.

Obraczka, K., "Massively Replicating Services in Wide-Area Internetworks," Ph.D. Dissertation, University of Southern California, Dec. 1994, pp. i-xv and 1-123.

Papadimitriou, C. et al., "Information Caching For Delivery Of Personalized Video Programs On Home Entertainment Channels," Proceedings of the International Conference On Multimedia Computing and Systems, Boston, MA, May 14-19, 1994, pp. 214-223.

Parmelee, J. [jparmele@csfbg.csfb.com:] "The Last Mile: Cable Modems vs. ISDN," Jan. 3, 1996, pp. 1-4.

Pasquale, J. et al., "The Multimedia Multicast Channel," Proceedings of 3rd International Workshop on Network and Operating System Support for Digital Audio and Video, San Diego, CA, Nov. 1992, pp. 1-11.

Pullen J. et al., "Dual-Mode Multicast For DIS," 12th Workshop on Standards for the Interoperability of Distributed Simulations, paper 12-95-087, Mar. 1995, 7 pages.

Rebane, G. J., "A Class Of Hierarchical Store/Forward Interactive Television Systems With An Approach To The Development Of Their Analytical Performance Models," SPIE, vol. 2615, Jun. 1996, 18 pages.

Rhodes, L. "The Race For More Bandwidth," Wired Magazine, Issue 4.01, Jan. 1996, pp. 1-8.

L.A. Rowe, J.S. Boreczky, D.A. Berger, D.W. Brubeck, J.E. Baldeschwieler, "A distributed hierarchical video-on-demand system," icip, p. 334, 1995 International Conference on Image Processing (ICIP'95)—vol. 1, 1995.

Sala, D. et al., "A Protocol For Efficient Transfer Of Data Over Fiber/Cable Systems," GIT-CC-95/18, Jun. 1995, Presented at IEEE INFOCOM'96, The Conference on Computer Communications, Mar. 1996, pp. 1-14.

Sharpe, Randy et al., "Taking ATM Home," Telecommunications International, Dec. 1995, 4 pages.

Sharpe, et al., "Taking ATM Home," Telephony, Aug. 21, 1995, pp. 38-42.

Sincoskie, W.D., "System Architecture For A Large Scale Video On Demand Service," Computer Networks and ISDN Systems 22, North-Holland, Nov. 26, 1991, pp. 155-162.

Sincoskie, W.D., "Video On Demand: Is It Feasible?" IEEE Global Telecommunications Conference, Dec. 2-5, 1990, pp. 305.3.1-305.3.5.

Smith, N., "What Can Archives Offer The World Wide Web?" University of Kent at Canterbury, Mar. 22, 1994, Presented at the First International World Wide Web Conference, Geneva (Switzerland), May 1994, pp. 1-12.

Viswanathan, S. et al., "Pyramid Broadcasting for Video On Demand Service," Proc. the SPIE Multimedia Computing and Networking Conference, San Jose, CA, 1995, pp. 1-25.

Wessels, "Intelligent Caching for World-Wide Web Objects," Master's Thesis, University of Colorado, 1995, pp. 1-85.

Woo, H. et al., "A New VOD Service Scheme With Dynamic Multicasting Capabilities," International Conference on Distributed Multimedia Systems and Application, IASTED/ISMM, Aug. 1994, pp. 37-40.

Woo, H. et al., "Multicast Scheduling for VOD Services," Multimedia Tools and Applications, 2, 157-171, 1996 Kiuwer Academic Publishers, Boston. Manufactured in The Netherlands, 1996, pp. 156-171.

Worrell, K.J., "Invalidation In Large Scale Network Object Caches," Master's Thesis, University of Colorado, Boulder, 1994, pp. i-vii and 1-49.

* cited by examiner

DELIVERING MULTIMEDIA SERVICES

CROSS-REFERENCE TO RELATED APPLICATIONS

This is a continuation application of application Ser. No. 10/777,912, filed Feb. 11, 2004, now U.S. Pat. No. 7,225,275 which is a continuation application of application Ser. No. 09/427,778, filed Oct. 26, 1999, now U.S. Pat. No. 6,732,179 which is a continuation-in-part application of application Ser. No. 08/811,586, filed on Mar. 5, 1997, now U.S. Pat. No. 6,370,571 and is related to application Ser. No. 09/428,235, filed Oct. 26, 1999, each of which is hereby incorporated by reference herein.

TECHNICAL FIELD

This invention relates to the high-performance end-to-end delivery of online multimedia services, including Internet services such as World Wide Web (WWW) access. The invention combines a scalable, hierarchical, distributed network architecture and processes for replicating, caching, and multicasting.

DESCRIPTION OF RELATED ART

Cable modems enable an end-user to make a high-bandwidth connection to a network system. For example, using a digital modulation technique called quadrature phase-shift keying (QPSK), a downstream connection with a bandwidth of about 10 megabits per second may be made by occupying a single 6 MHz channel out of the 750 MHz total coaxial capacity typical in most modern cable television systems, and an upstream connection with 768 kilobits per second may be made by occupying 600 KHz of that capacity. The bandwidth may be increased or decreased by occupying more or less bandwidth as desired. Other modulation techniques are also available, such as quadrature-carrier amplitude modulation (QAM). The technology for such connections is available, for example, from companies such as Motorola, the LanCity division of Bay Networks, and Hewlett Packard. Unlike telecommunications connections that use dedicated switched lines, cable modem connections use a shared medium and so can be continuously "on" without substantial waste of resources.

Although cable modems provide a practical high-speed connection from the end-user to the network, nevertheless, such a high-speed connection is not enough by itself to deliver high-performance online services, especially with regards to Internet services, such as World Wide Web (WWW) access. In order to deliver high-performance end-to-end Internet service, solutions are needed to the problems of redundant data traffic, unreliable network performance, and scalability.

The Internet is a publicly accessible internetwork of networks. Internet Service Providers (ISPs) provide Internet access to businesses and consumers via points of presence (POPs) that are connected to network access points (NAPs) which are entry points to the Internet.

One of the Internet's architectural weaknesses, and the cause of many of its current performance issues, is its highly redundant data traffic. For example, when an end-user downloads a video clip from the popular CNN (Cable News Network) Web site, data packets containing bits of the video clip are "pulled" all the way across the Internet: from the CNN WWW server, to CNN's ISP (ISP), through potentially several paths across the Internet including multiple interchanges on the Internet backbone, to the end-user's ISP, and finally to the end-user's computer system. If the end-user's next-door neighbor soon thereafter requests the very same video clip from the CNN Web site, she also pulls the bits of the clip all the way across the Internet. The result is that many of the same bits are moved over and over again over the same communication paths going to CNN's ISP, across the Internet, and to the end-user's ISP.

Another weakness of the Internet is its unreliable performance. The Internet performs in an intermittent or otherwise unreliable manner due in part to traffic bottlenecks which constrict the flow of data in the system. Unfortunately, there is no coherent scheme to deal with such bottlenecks because of the decentralized nature of the management of the Internet.

Yet another weakness of the Internet is its lack of security. This lack of security is particularly significant because it tends to inhibit electronic transactions and is in part due to the public nature of the Internet.

In order to provide for future growth for a network, it is important that the network architecture and operation be scalable to larger size and/or higher speeds. If the architecture is not readily scalable to a larger size, network performance will suffer when the network is expanded. If the network is not readily scalable to higher speeds, performance will suffer when network traffic increases.

SUMMARY OF THE INVENTION

The present invention relates to a system and method for delivering high-performance online multimedia services, including Internet services such as WWW access, that satisfies the above-described needs. The system and method combine a scalable, hierarchical, distributed network architecture and processes for replicating and caching frequently-accessed multimedia content within the network, and multicasting content customized per region or locality.

The digital network architecture couples a high-speed backbone to multiple network access points (NAPs) of the Internet, to a network operation center, to a back office system, and to multiple regional data centers. Each regional data center couples to several modified head-ends, which in turn couple via fiber optics to many neighborhood optoelectronic nodes. Finally, each node couples via coaxial cable and cable modems to multiple end-user systems. The architecture separates the public Internet from a private network with enhanced security to facilitate electronic transactions.

The backbone provides a transport mechanism that can be readily scaled to higher speeds. The backbone also enables bandwidth to the Internet to be increased, without reconfiguring the network structure, either by increasing the speed of the existing couplings at the NAPs or by adding a new coupling to a NAP. Finally, the backbone allows service to be extended to a new area, again without reconfiguring the network structure, by simply coupling a new regional data center (RDC) to the backbone.

The network operation center (NOC) is a centralized control center which efficiently coordinates the management of the privately controlled network. The network management system (NMS) server at the NOC coordinates NMS clients at the RDCs. The management of the private network enables the optimization of performance. The hierarchical nature of the management allows consistent system configuration and management which results in a high level of overall network security and reliability.

Certain frequently-accessed information or content is cached within and replicated amongst the RDCs. This reduces traffic redundancy since an end-user's request for data that has been so replicated or cached may be fulfilled by the "nearest" (most closely coupled) RDC. In addition, the RDCs are able to multicast content that has been customized for the region to end-users in the region. This further reduces redundant traffic. Finally, the RDCs contain NMS clients that monitor and proactively manage network performance in the region so that traffic bottlenecks may be identified and overcome. The NMS detects and figures out the locations of the faults throughout the network, correlates failures, and can report faults to the appropriate repair entities, create trouble tickets, and dispatch repair crews.

Frequently-accessed content is also cached within the modified head-ends. This further reduces redundant traffic because an end-user's request for content that has been so cached may be fulfilled by the "nearest" modified head-end.

Finally, the hierarchical nature of the private network architecture enables multicast data to be efficiently customized for each region receiving the multicast.

DETAILED DESCRIPTION OF THE PREFERRED EMBODIMENTS

The preferred embodiments of the present invention are now described with reference to the figures.

Figure 1:
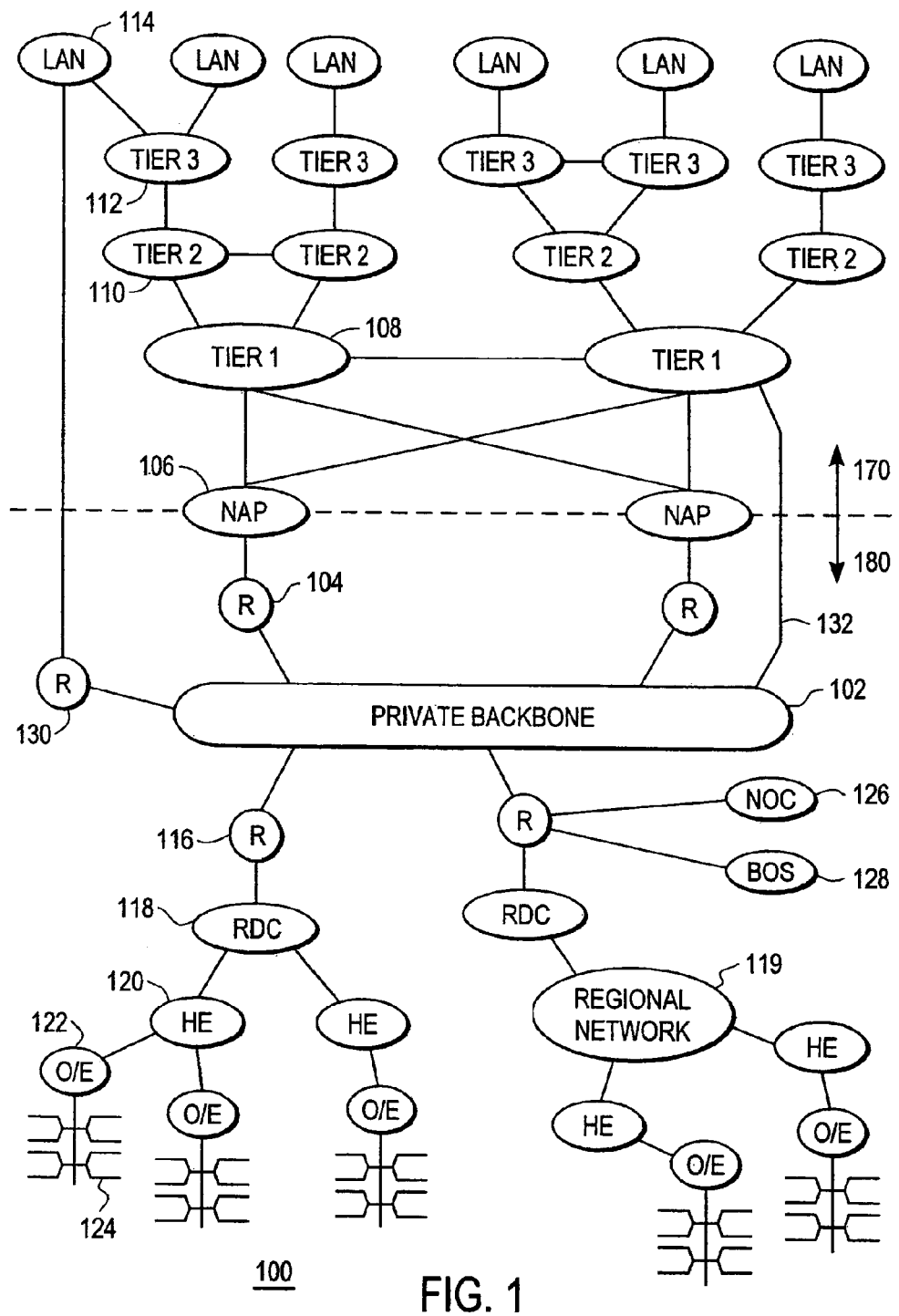
FIG. 1 is a diagram of a scalable, hierarchical, distributed network architecture for delivering high-performance online multimedia services constructed according to a preferred embodiment of the present invention.

FIG. 1 is a diagram of a scalable, hierarchical, distributed network architecture for delivering high-performance online multimedia services constructed according to a preferred embodiment of this invention. In the architecture of the present invention, the distributed public Internet (top portion) 170 is separated from a hierarchical private network (bottom portion) 180 under private control.

A high-speed, private backbone 102 is connected via routers (R) 104 to network access points (NAPs) 106 of the Internet. In a preferred embodiment of the present invention, the private backbone 102 runs asynchronous transfer mode (ATM) service over bandwidth leased from commercial providers such as MCI Communications, AT&T, or Sprint. ATM is a high-speed, cell-based service which allows different types of traffic to be supported at different levels of service. The routers 104 are internet protocol (IP) routers such as those commercially developed by Cisco Systems.

The NAPs 106 are access points into the Internet to which a number of routers can be connected. NAPs 106 are located, for example, in San Francisco, Chicago, and Washington, D.C. A typical NAP 106 is a fiber distributed data interface (FDDI) ring which connects to one or more tier 1 (national) backbones 108 of the Internet, such as the commercially operated backbones of Advanced Network & Services (ANS), MCI Communications, or Sprint. FDDI is a high-speed Token Ring network designed specifically to use optical fibers as connecting media.

Each of these tier 1 backbones 108 connects to one or more tier 2 (regional) networks 110, which in turn connects to one or more tier 3 (local) networks 112. Finally, each tier 3 network 112 connects to one or more local area networks (LANs) 114. A LAN 114 may include various servers, such as, for example, the World Wide Web server which provides the popular ESPN SportZone web site for sports information. There may also be private peering between networks in the same tier. For example, a tier 1 network 108 may have a connection to another tier 1 network.

Note that in FIG. 1 the networks above the NAPs 106 (i.e. the tier 1 backbones 108, the tier 2 networks 110, the tier 3 networks 112, and the LANs 114) are part of the publicly accessible Internet 170. Thus, for example, information made available on their WWW servers (http servers) may be accessed by client computer systems (http clients) connected to the Internet. Of course, FIG. 1 shows only a simplification of the complexity of the Internet 170. For example, a tier 1 network 108 may connect to various dial-up providers to which end-users may connect via modems.

The private backbone 102 is also connected via routers 116 to one or more regional servers 302 (see FIG. 3) at regional data centers (RDCs) 118. Each of the RDCs 118 is connected to one or more local servers 402 (see FIG. 4) at modified head-ends 120 within a hybrid fiber-coax (HFC) distribution system. Each of the local servers 402 at the modified head-ends 120 is connected (via fiber optics) to many neighborhood optoelectronic (O/E) nodes 122 within the HFC distribution system. There are typically over a hundred nodes 122 connected to each modified head-end 120, even though FIG. 1 shows only a few for convenience and ease of understanding. Finally, the nodes 122 are connected (via coaxial cable and cable modems) to many end-user systems 124 located typically within people's homes or offices. There are typically over a hundred end-user systems 124 connected to each node 122, even though FIG. 1 shows only a few for convenience and ease of understanding.

In addition, at least one of the routers 116 connects private backbone 102 to a network operations center (NOC) 126 and a back office system (BOS) 128. The NOC 126 is the centralized control center which efficiently coordinates the management of the private network 180. The BOS 128 includes software for subscriber management and billing. The NOC 126 and the BOS 128 are also connected together so that they can communicate with each other without going through the router 116.

Furthermore, the private backbone 102 connects via an additional router 130 to a particular LAN 114 in order to give the network 180 more direct access to content on that particular LAN 114. The particular LAN 114, for example, may be one which houses a server for a frequently accessed commercial WWW site such as the ESPN SportsZone site. In such a case, data from that LAN 114 may travel towards an end-user 124 either via the Internet 170 (for example, on a path through tier 3 112, tier 2, 110, tier 1 108, NAP 106, and router 104) or via the short-cut through the additional router 130 which bypasses the Internet 170.

Finally, the private backbone 102 may peer with another private network, such as a tier 1 network 108. This private peering is implemented via a connection between the two networks. Peering generally involves a coupling between two networks on the same hierarchical level.

Note that in FIG. 1 the networked objects below the NAPs 106 (i.e. the private backbone 102, the routers 104, 116, and 130, the RDCs 118, the modified head-ends 120, the nodes 122, the end-user systems 124, the NOC 126, and the BOS 128) are part of a private network 180 under private control.

Figure 2:
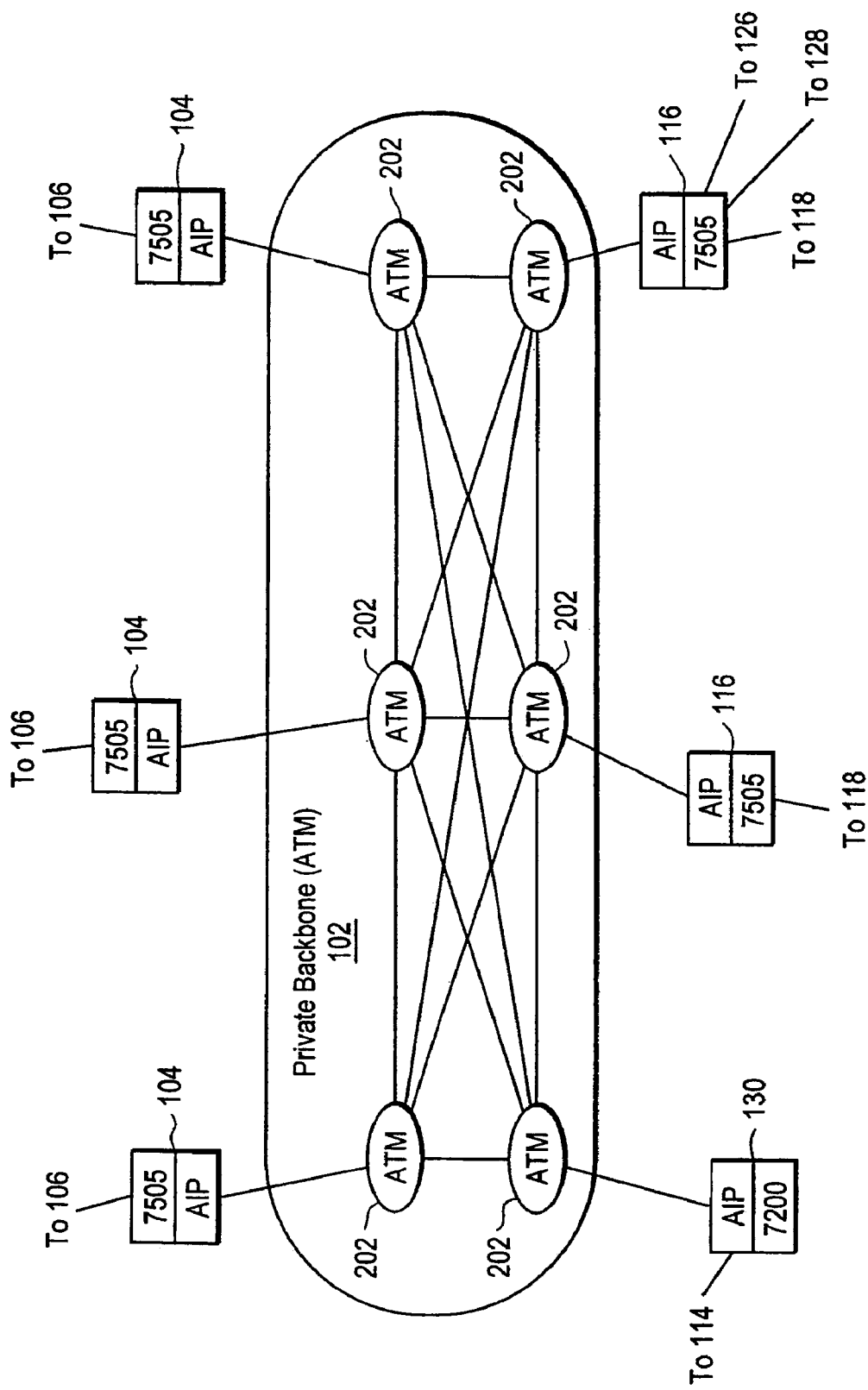
FIG. 2 is a diagram of a private backbone and connecting routers in a preferred embodiment of the present invention.

FIG. 2 is a diagram of the private backbone 102 and connecting routers 104 116, and 130 in a preferred embodiment of this invention. In this embodiment, the private backbone 102 is based on an interconnected network of switches 202 capable of supporting Asynchronous Transfer Mode (ATM) service.

The ATM service is a high-speed, cell-based, switching technique which provides bandwidth on-demand. This capability of the ATM service to provide bandwidth on-demand allows each type of traffic to be supported at an appropriate level of service, and thus makes possible the integration of voice, video, and data traffic into one network. The physical layer under the ATM service (i.e. the connections between the ATM switches 202) is typically provided by Synchronous Optical Network/Synchronous Digital Hierarchy (SONET/SDH) technology. Widely supported speeds of SONET/SDH currently include 155 Mbps, 622 Mbps, and 2.488 Gbps.

The switches 202 connect via routers 104 to the NAPs 106. Routers 104 are currently comprised of a commercially available Internet Protocol (IP) router and an interface board to interface between the ATM service and the IP layer. For example, the IP router may be Cisco Systems' model 7505 router, and the interface board may be an "AIP" board that connects to the IP router. In effect, the AIP board couples the backbone 102 to the IP router. Such a configuration is available from Cisco Systems, San Jose, Calif.

The switches 202 also connect via routers 116 to the high-availability (H/A) regional servers 302 (see FIG. 3) at the RDCs 118. These routers 116 also comprise an Internet Protocol (IP) router, such as the Cisco 7505 router, and an interface board, such as the AIP board. In addition to connecting to the RDCs 118, at least one of these routers 116 also connects to the NOC 126 and the BOS 128 in order to provide a communications channel for network management.

Finally, the switches 202 may connect via routers 130 directly to particular LANs 114 in order to give end-user systems 124 more direct access to content on those particular LANs 114. These routers 130 comprise an IP router, such as Cisco System's 7200 router, and an interface board, such as the AIP board.

Figure 3:
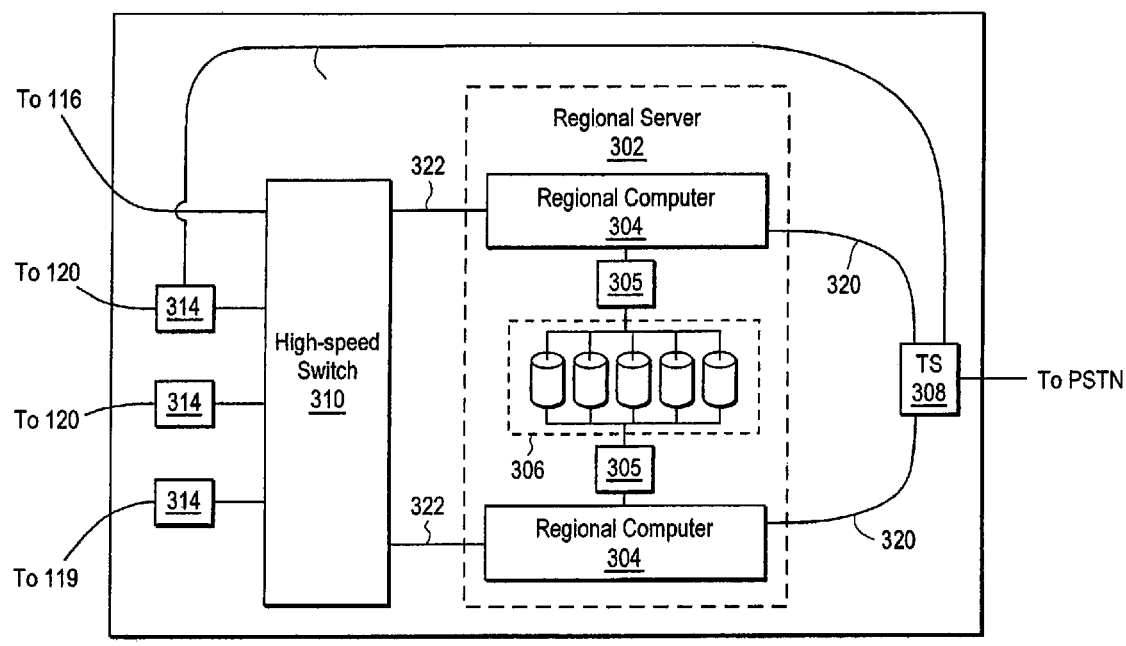
FIG. 3 is a diagram of a regional data center in a preferred embodiment of the present invention.

FIG. 3 is a diagram of a regional data center (RDC) 118 in a preferred embodiment of this invention. The RDC 118 includes a H/A regional server 302, a terminal server 308, a high-speed switch 310, and various blocks 304.

The regional server 302 may include a cluster of computers for high availability and performance. In this embodiment, the regional server 302 comprises two regional computers 304 which are both able to access a regional disk array 306 via a regional array controller 305. The regional computers 304 may be, for example, based on servers commercially available from Sun Microsystems, and the high-speed connections may be, for example, connections based on the Fiber Channel Standard. The regional computers 304 and the regional disk array 306 may be configured such that they provide high availability to one of the various RAID levels. In RAID (Redundant Array of Independent Disks) Level 1, redundancy is provided by mirroring data from one drive to another. In RAID Level 5, data is stored across multiple drives, parity is generated, and parity is distributed across the drives in the array 306. RAID Levels are well known in the computer industry.

The two regional computers 304 each have a connection 320 to the terminal server (TS) 308. The terminal server 308 connects via a modem to the public switched telephone network (PSTN) to provide an alternative backup communication and control channel between the RDC 118 and the NOC 126. A terminal server is generally a computer capable of either input or output to a communication channel. Here, the terminal server 308 is capable of both receiving input from and sending output to the PSTN.

The regional computers 304 also each have a connection 322 to the high-speed switch 310. These connections 322 may be made, for example, using 100 BaseT Ethernet (which is well known in the industry and can transfer data at 100 Mbps), and the high-speed switch 310 may be capable of switching data at gigabit per second speed.

The high-speed switch 310 has a connection via one of the routers 116 to one of the ATM switches 202 of the private backbone 102. The high-speed switch 310 also has one or more connections via blocks 314 to modified head-ends 120 or to a regional network 119 (which in turn connects to several modified head-ends 120). Each block 314 may comprise either an ATM switch, a router, or a point-to-point connection, as appropriate, depending on the system to which the high-speed switch 310 is connecting. The blocks 314 may also have connections to the terminal server 308 as shown by line 324.

Figure 4:
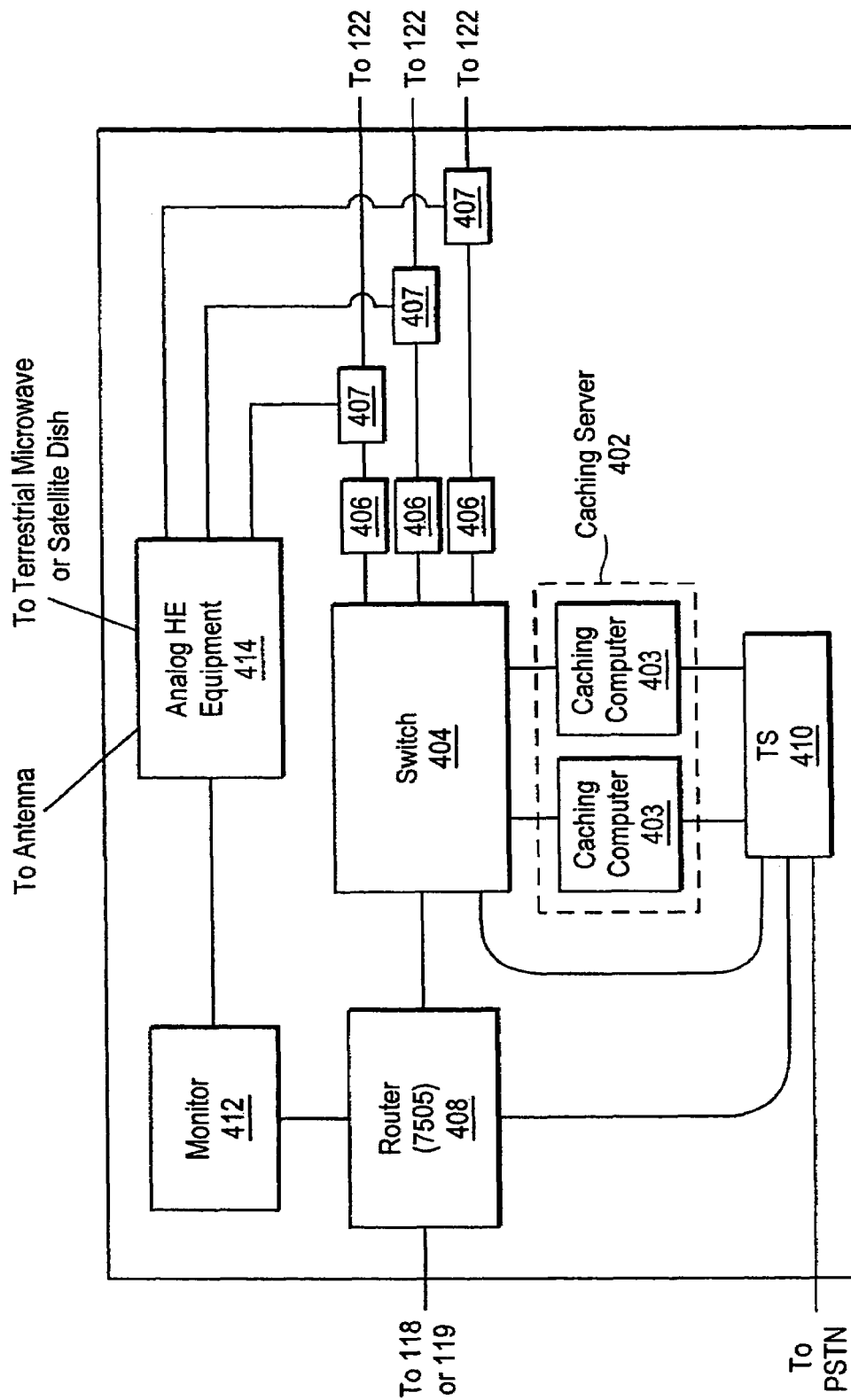
FIG. 4 is a diagram of a modified head-end in a preferred embodiment of the present invention.

FIG. 4 is a diagram of a modified head-end 120 in a preferred embodiment of this invention. The modified head-end 120 includes a caching server 402, a switch 404, many head-end modems 406 and multiplexers 407, a router 408, a terminal server (TS) 410, a monitor device 412, and analog head-end equipment 414.

In this embodiment, the caching server 402 comprises two interconnected caching computers 403 which may be, for example, based on computers commercially available from Silicon Graphics Inc. of Mountain View, Calif. Two caching computers 403 are used to provide more efficient and robust caching service. For example, the cache may be partitioned between the two computers 403 by having data with URLs of an odd number of characters being cached at one computer 403 and data with URLs of an even number of characters being cached at the other computer 403. Moreover, if one computer 403 goes down, then requests may be sent (by a Java script loaded into the browser) to the other computer 403. Thus, caching would continue even when one of the two computers 403 are down.

The switch 404 may be, for example, a full duplex fast ethernet switch. A full duplex fast ethernet switch 404 can support data flowing in both directions at the same time (for example, between the caching server 402 and the head-end modems 406). The connections between the caching server 402 and the switch 404 may be made, for example, using 100 BaseT Ethernet.

The head-end modem 406 modulates analog carrier signals using the digital data received from the switch 404 and sends the modulated analog signals to the multiplexer 407. The multiplexer 407 sends the modulated analog signals, along with TV signals received from the analog HE equipment, downstream to a node 122 of the distribution network.

Conversely, the multiplexer 407 receives an upstream modulated analog signal from the node 122 and sends the upstream signal to the modem 406. The modem 406 demodulates the modulated analog signals received from the multiplexer 407 to retrieve digital data that is then communicated to the switch 404.

There is need for typically over a hundred such head-end modems 406, one for each of the over a hundred nodes 122 typically supported by the modified head-end 120. Such a head-end modem 406 may be implemented, for example, with the LANcity head-end modem from the LANcity division of Bay Networks. The LANcity division is located in Andover, Mass. Alternatively, communication with the end-user system 124 may be asymmetric in that the return path from the end-user system 124 may be via the public switched telephone network (PSTN) or some other communication channel.

The router 408 connects to the switch 404 and to an RDC 118 or a regional network 119 (which in turn connects to an RDC 118). The router 408 may be implemented, for example, using the 7505 router from Cisco Systems, and the connection between the router 408 and the fast switch 404 may be implemented, for example, using 100 BaseT Ethernet.

The terminal server (TS) 410 is connected to the caching server 402, the switch 404, the router 408, and the PSTN. The terminal server 410 provides, via the PSTN, an alternative backup communication and control channel between the modified head-end 120 and the RDC 118 or the NOC 126.

The monitor device 412 is a "synthetic load" saddled onto the digital network 180 via the router 408. The monitor 412 monitors the analog cable television distribution system via analog head-end equipment 414. The analog head-end equipment 414 typically receives local television (TV) signals via a terrestrial microwave dish or a satellite dish. These TV signals are fed into the multiplexers 407 and sent, along with the modulated analog signals from the cable modems 406, to nodes 122 of the distribution network. By communicating with the monitor 412, the NOC 126 of the digital network 180 is able to access the analog network management gear by "remote control."

Figure 5:
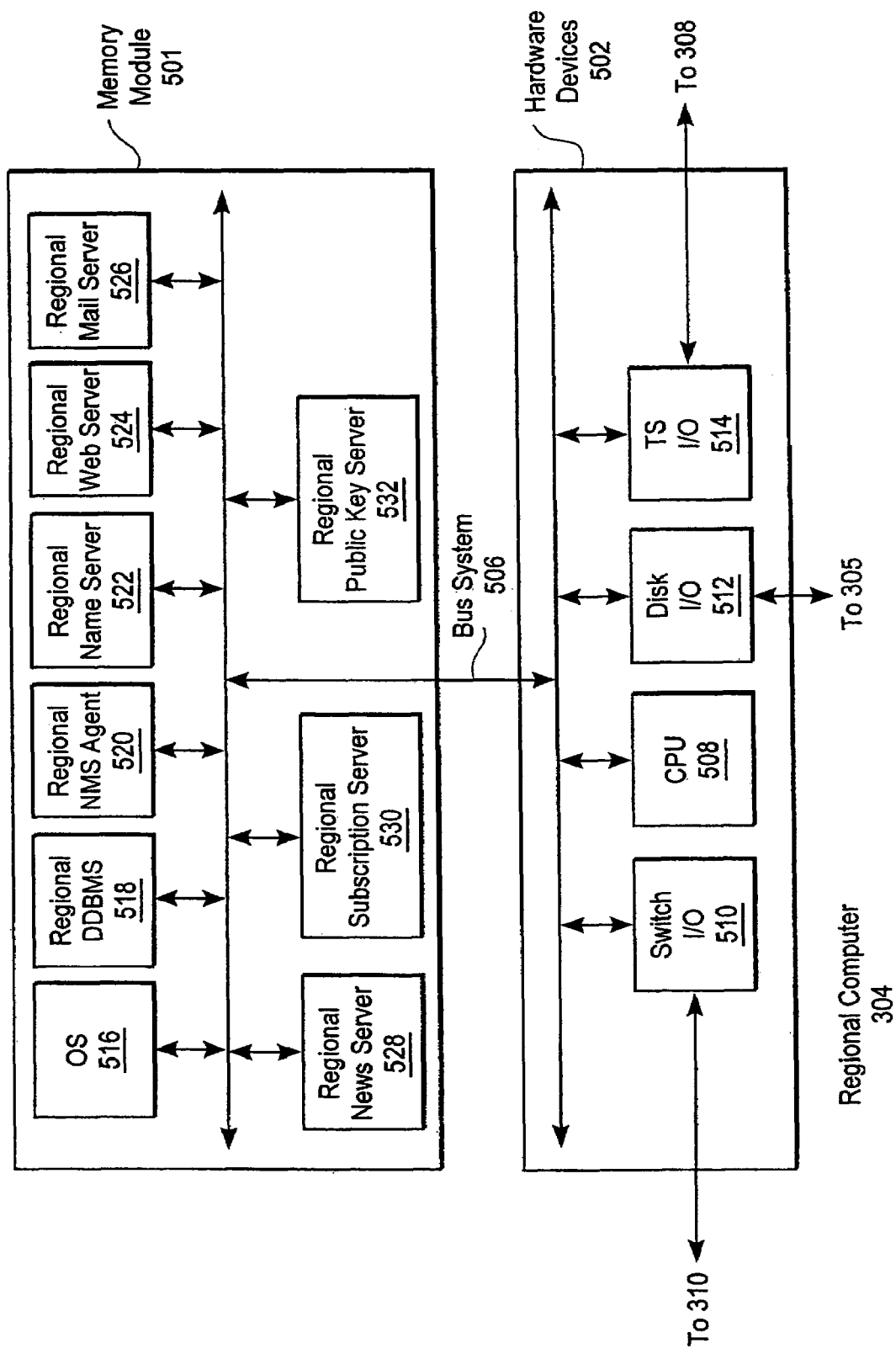
FIG. 5 is a diagram of a regional computer within a regional data center in a preferred embodiment of the present invention.

FIG. 5 is a diagram of a regional computer 304 within the RDC 118 in a preferred embodiment of this invention. The regional computer 304 includes hardware devices 502 and software devices in a memory module 504 connected by a bus system 506.

The hardware devices 502 include a central processing unit (CPU) 508, for example, an Intel 80×86, Motorola PowerPC, or Sun SPARC processor, communicating with various input/output (I/O) devices, such as a switch I/O 510 that connects to the high-speed switch 310, a disk I/O 512 that connects to the regional array controller 305, and a terminal server (TS) I/O 514 that connects to the terminal server 308. The CPU 508 and the various I/O devices each connect to the bus system 506 and communicate thereby.

The software devices in the memory module 504 include an operating system (OS) 516, for example, Windows NT or a flavor of UNIX, communicating with a regional distributed database management system (DDBMS) module 518, a regional network management system (NMS) agent 520, and various other software devices, such as a regional nameserver 522, a regional web server 524, a regional mail server 526, a regional news server 528, a regional subscription server 530, and a regional public key server 532.

The regional DDBMS software 518 handles back-end database functions, such as queries and transactions, for databases stored in the regional disk array 306. The regional DDBMS software 518 also handles front-end database functions, such as replication of certain data and multimedia content amongst the plurality of RDCs 118. In handling the front-end functions, the regional DDBMS software 518 communicates with the regional DDBMS software 518 in the other RDCs 118 and with the central DDBMS software 818 in the NOC 126. The regional DDBMS software 518 may be implemented, for example, using software from Oracle Corporation in Redwood Shores, Calif.

The regional NMS agent 520 monitors and proactively manages the part of the network under its regional data center (RDC) 118 and communicates the status of the region to a central NMS station 820 in the network operations center (NOC) 126. This hierarchical management of the network saves valuable bandwidth resources between the RDCs 118 and the NOC 126 and allows regional network faults to be more quickly repaired or circumvented. The regional NMS agent 520 may be implemented, for example, using NetExpert software from Objective Systems Integrators in Folsom, Calif.

The various other software devices perform various additional functions and services. For example, the regional nameserver 522 receives requests for IP addresses associated with domain names. For example, if the particular domain name is contained in the database of domain names stored at the regional server 302, then the regional nameserver 522 will return the associated IP address back to the end-user system 124 which made the request. The database of domain names (and corresponding IP addresses) is updated via replication from the central server 703 and amongst the regional servers 302.

The regional web (http) server 524 serves multimedia content from the regional server 302 to end-user systems 124. The multimedia content is served in the form of html, vrml, image, audio, and video files, or may be in other forms. These files may be updated via replication from the central server 703 and amongst the regional servers 302. The regional web server 524 may be, for example, based on the Netscape Enterprise Server from Netscape Communications in Mountain View, Calif.

The regional web server 524 may also multicast select multimedia content, such as audio or video from live events, to select groups of the end-user systems 124. The multicasting may be performed using multicast IP which utilizes the user datagram protocol (UDP) to send IP packets selectively to multiple nodes in a logical group. Only one copy of the multimedia content being multicast will pass over any network link, allowing more efficient use of the available bandwidth between the RDCs 118 and the end-user systems 124.

The regional web server 524 may also serve requests originating from the public Internet 170. For example, a personal web page may be uploaded from the end-user system 124 to the RDC 118 and stored in a directory in the regional disk array 306. By configuring the regional web server 524, such a page may be made available to the Internet 170.

Figure 6:
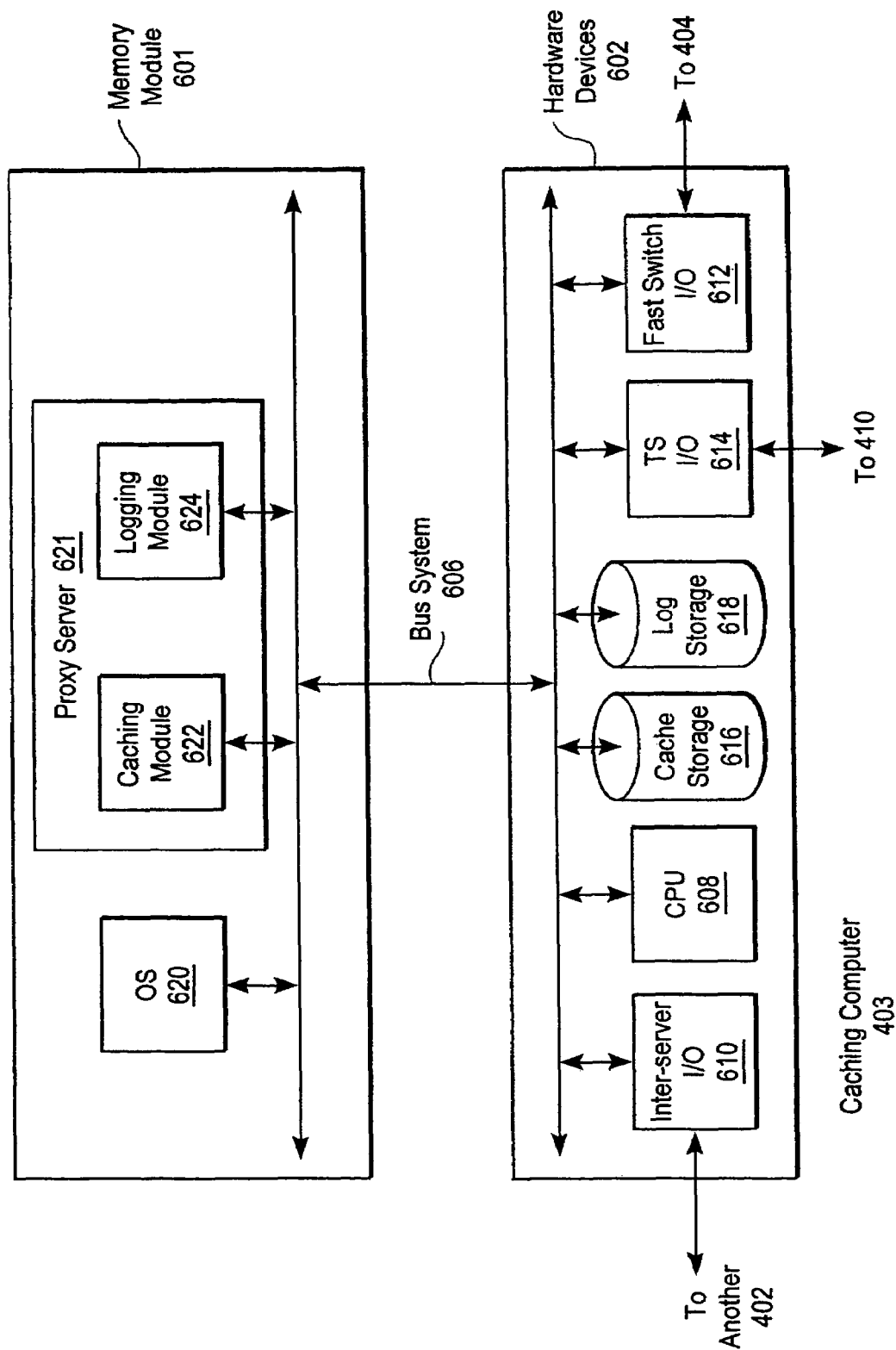
FIG. 6 is a diagram of a caching computer within the modified head-end in a preferred embodiment of the present invention.

FIG. 6 is a diagram of a caching computer 403 within the modified head-end 120 in a preferred embodiment of this invention. The caching computer 403 includes hardware devices 602 and software devices in a memory module 604 connected by a bus system 606.

The hardware devices 602 include a central processing unit (CPU) 608, for example, an Intel 80×86, Motorola PowerPC, or Sun SPARC processor, communicating with various input/output (I/O) devices, such as: (1) an inter-server I/O 610 that connects to another caching computer 403, (2) a switch I/O 612 that connects to the switch 404, (3) a terminal server (TS) I/O 614 that connects to the terminal server 410 in the modified head-end 120, (4) a cache storage device 616; and (5) a log storage device 618. The CPU 608 and the various I/O devices each connect to the bus system 606 and communicate thereby.

The software devices in the memory module 604 include an operating system 620, for example, Windows NT or a flavor of UNIX, communicating with a proxy server 621 which comprises a caching module 622 and a logging module 624. The proxy server 621 receives requests from end-user systems 124 for multimedia content. The multimedia content requested is in the form of html, vrml, image, audio, and video files, or may be in other forms.

If the requested file is contained in the cache storage 616, then the proxy server 621 sends the file from the cache storage 616 to the requesting end-user system 124. The caching module 622 stores recently-served files in the cache storage 616. Files in the cache storage 616 are typically stored using a least-recently used (LRU) policy. LRU policy caches are well known in the pertinent art.

If the requested file is not contained in the cache storage 616, then the proxy server 621 sends out a request for the file via the router 408. When the requested file is received back at the proxy server 621, then the proxy server 621 forwards the file to the end-user system 124.

The preceding discussion describes a single level of proxy. Multiple levels of proxy are also possible. The second level of proxy would be, for example, at the RDC 118 level. The operation of such a system with two levels of proxy is illustrated and described below in conjunction with FIG. 11.

The logging module 624 stores transaction information in an access log file and an error log file stored in the log storage 618. The access log file includes information such as the hostname or IP address of the requester, the file requested, and the time of the request. The error log file contains a record of problems encountered by the proxy server 621.

Figure 7:
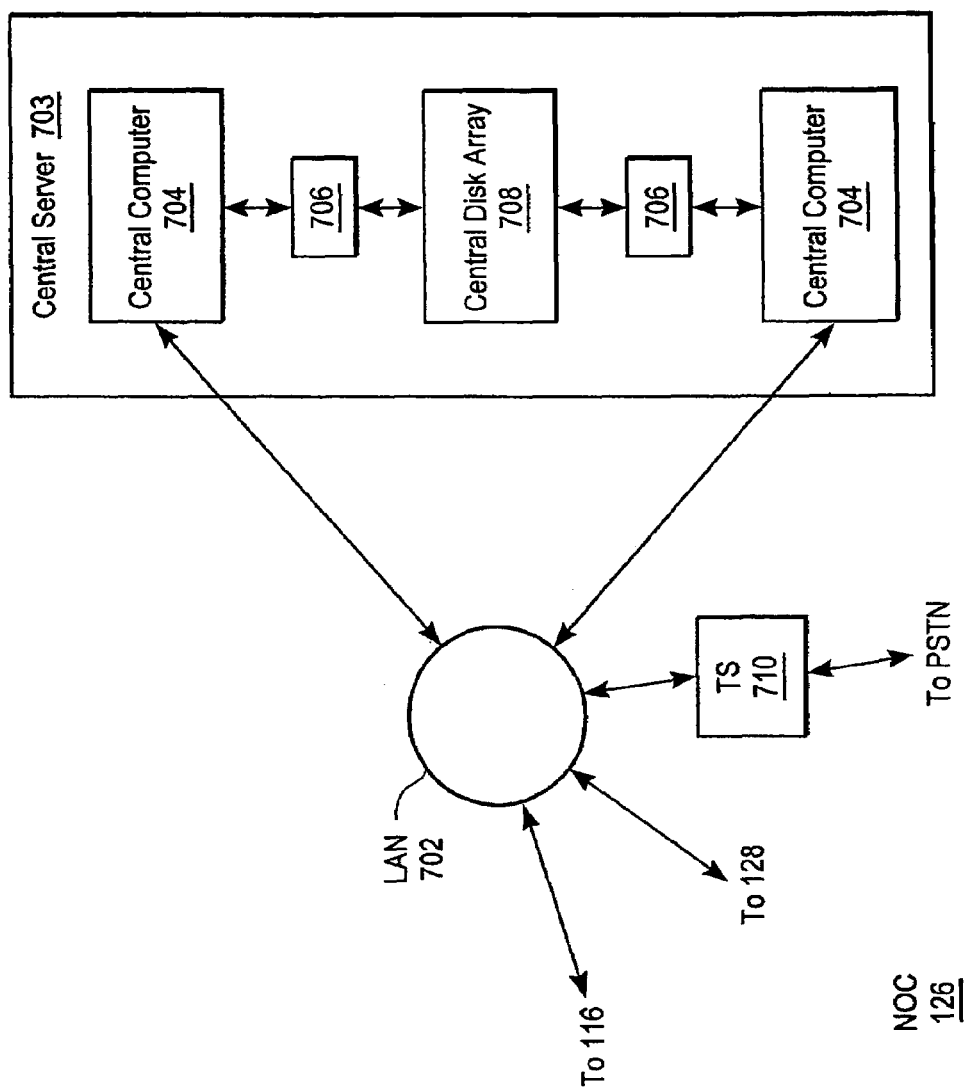
FIG. 7 is a diagram of a network operations center in a preferred embodiment of the present invention.

FIG. 7 is a diagram of a network operations center (NOC) 126 in a preferred embodiment of this invention. The NOC 126 includes a local area network (LAN) 702 connecting together a central server 703 and a terminal server 710. The LAN 702 also connects to the router 116 between the backbone 102 and the RDC 118 and to the back office system 128.

The central server 703 may be implemented as a high-availability server. An example of such a high-availability central server 703 is shown in FIG. 7, including two central computers 704 connected by array controllers 706 to a central disk array 708.

The terminal server 710 connects to the public switched telephone network (PSTN) and provides an alternate backup means by which to communicate from the NOC 126 to the RDCs 118 and the modified head-ends 120.

Figure 8:
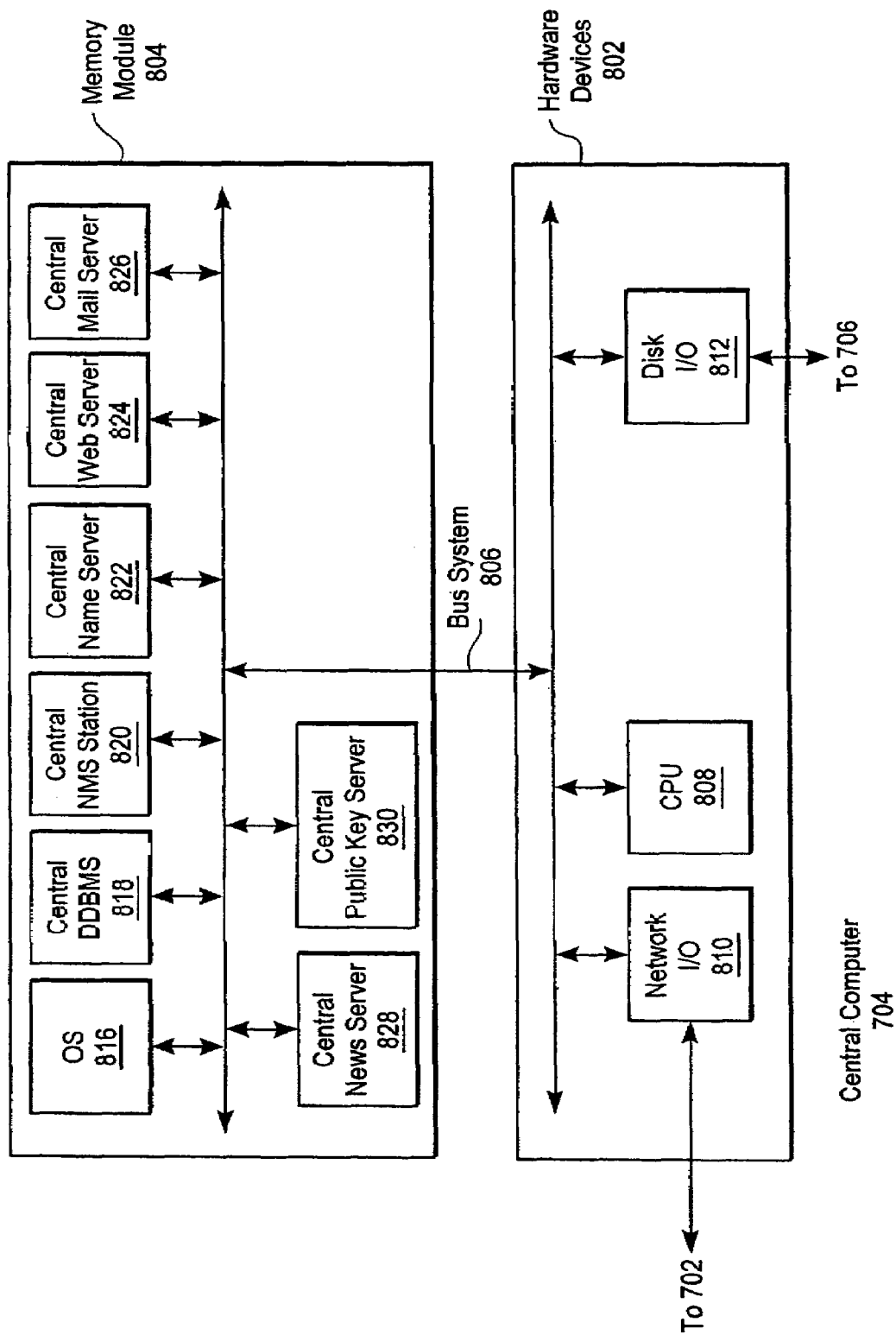
FIG. 8 is a diagram of a central computer within a network operations center in a preferred embodiment of the present invention.

FIG. 8 is a diagram of a central computer 704 within a network operations center 126 in a preferred embodiment of this invention. The central computer 704 includes hardware devices 802 and software devices in a memory module 804 connected by a bus system 806.

The hardware devices 802 include a central processing unit (CPU) 808, for example, an Intel 80×86, Motorola PowerPC, or Sun SPARC processor, communicating with various input/output (I/O) devices, such as a network I/O 810 that connects to the LAN 702 and a disk I/O 812 that connects to the array controller 706. The CPU 808 and the various I/O devices each connect to the bus system 806 and communicate thereby.

The software devices in the memory module 804 include an operating system (OS) 816, for example, Windows NT or a flavor of UNIX, communicating with a central distributed database management system (DDBMS) module 818, a central network management system (NMS) station 820, and various other software devices, including a central nameserver 822, a central web server 824, a central mail server 826, a central news server 828, and a central public key server 830.

The central DDBMS software 818 handles back-end database functions for databases stored in the central disk array 708 and front-end database functions, such as replication of certain data and multimedia content between the NOC 126 and the RDCs 118. In handling the front-end functions, the central DDBMS software 818 communicates with the regional DDBMS software 518. The central DDBMS software 818 may be implemented, for example, using software from Oracle Corporation.

The central NMS station 820 communicates with and coordinates the regional NMS agents 518. The central NMS station 820 provides a "mission control" station for managing the private network 180. The central NMS station 820 may be implemented, for example, using NetExpert software from Objective Systems Integrators.

The various other software devices perform various additional functions and services. For example, the central nameserver 822 communicates with the regional nameservers to update the database of domain names stored at the RDCs 118.

Figure 9:
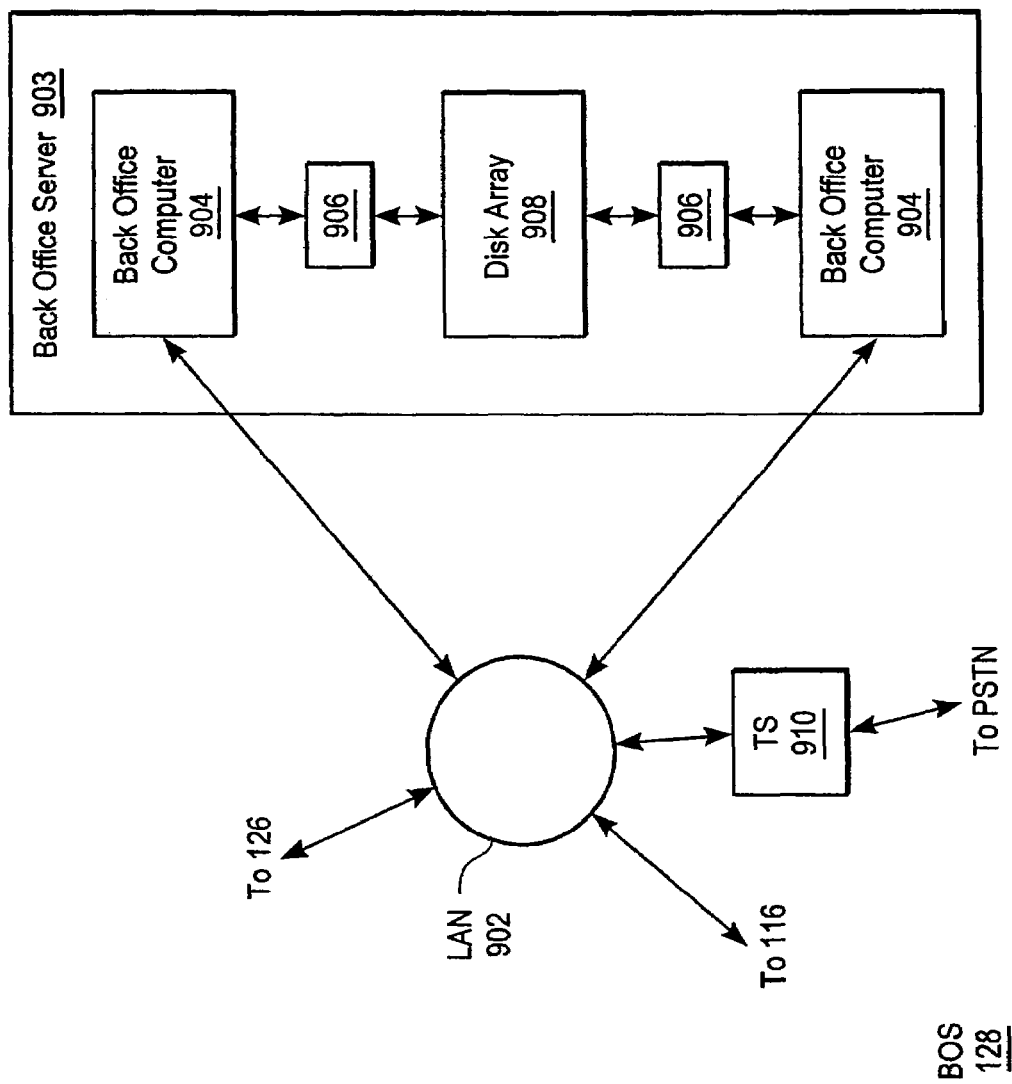
FIG. 9 is a diagram of a back office system in a preferred embodiment of the present invention.

FIG. 9 is a diagram of a back office system (BOS) 128 in a preferred embodiment of this invention. The BOS 128 includes a local area network (LAN) 902 connecting together a back office server 903 and a terminal server 910. The LAN 902 also connects to the router 116 between the backbone 102 and the RDC 118 and to the NOC 126.

The back office server 903 may be implemented as a high-availability server. An example of such a high-availability back office server 903 is shown in FIG. 9, including two back office computers 904 connected by array controllers 906 to a back office disk array 908.

The terminal server 910 connects to the public switched telephone network (PSTN) and provides an alternate backup means by which to communicate from the BOS 128 to the RDCs 118 and the modified head-ends 120.

Figure 10:
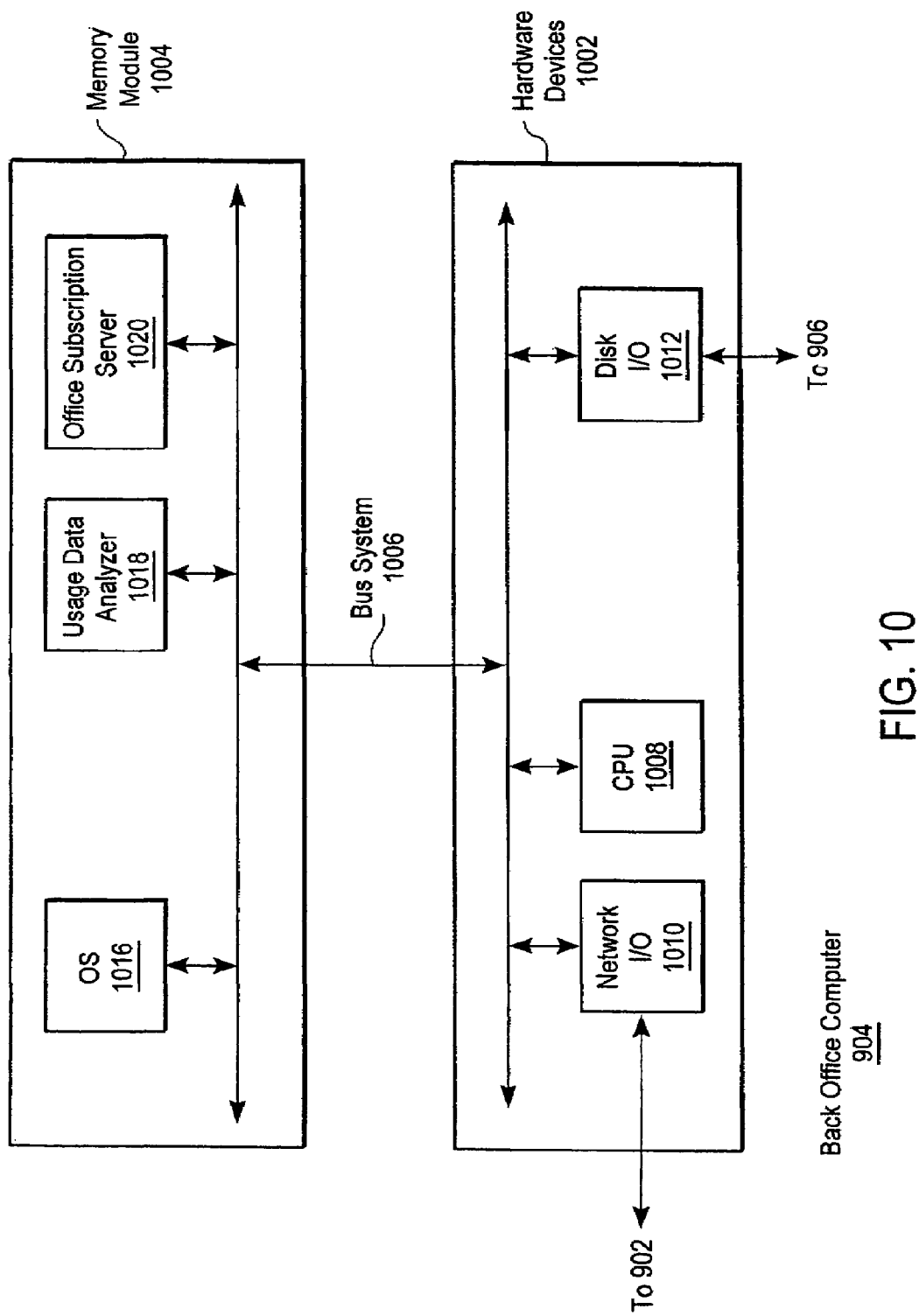
FIG. 10 is a diagram of a back office computer within a back office system in a preferred embodiment of the present invention.

FIG. 10 is a diagram of a back office computer 904 within a back office system (BOS) 128 in a preferred embodiment of this invention. The back office computer 904 includes hardware devices 1002 and software devices in a memory module 1004 connected by a bus system 1006.

The hardware devices 1002 include a central processing unit (CPU) 808, for example, an Intel 80×86, Motorola PowerPC, or Sun SPARC processor, communicating with various input/output (I/O) devices, such as: (1) a network I/O 1010 that connects to the BOS LAN 902 and (2) an office disk I/O 1012 that connects to the array controller 906. The CPU 1008 and the various I/O devices each connect to the bus system 1006 and communicate thereby.

The software devices in the memory module 1004 include an operating system (OS) 1016, for example, Windows NT or a flavor of UNIX, communicating with a usage data analyzer 1018 and various other software devices, such as an office subscription server 1020.

The usage data analyzer 1018 communicates with the logging modules 624 in the modified head-ends 120. The usage data analyzer 1018 statistically analyzes the data in the access and error logs kept by the logging modules 624 in the log storages 618. Statistics analyzed include, but go well beyond, how many times a web page (an html file) was "hit" (accessed), when those hits occurred, and from what domains those hits came. Although in this embodiment the usage data analyzer 1018 is implemented in the BOS 128, it may also be implemented in the NOC 126.

The various other software devices perform various additional functions and services. For example, the office subscription server 1022 communicates with and updates the regional subscription servers 530 which keep track of services subscribed to by the end-user systems 124. Although implemented in the BOS 128, the office subscription server 1022 may also be implemented in the NOC 126.

Figure 11:
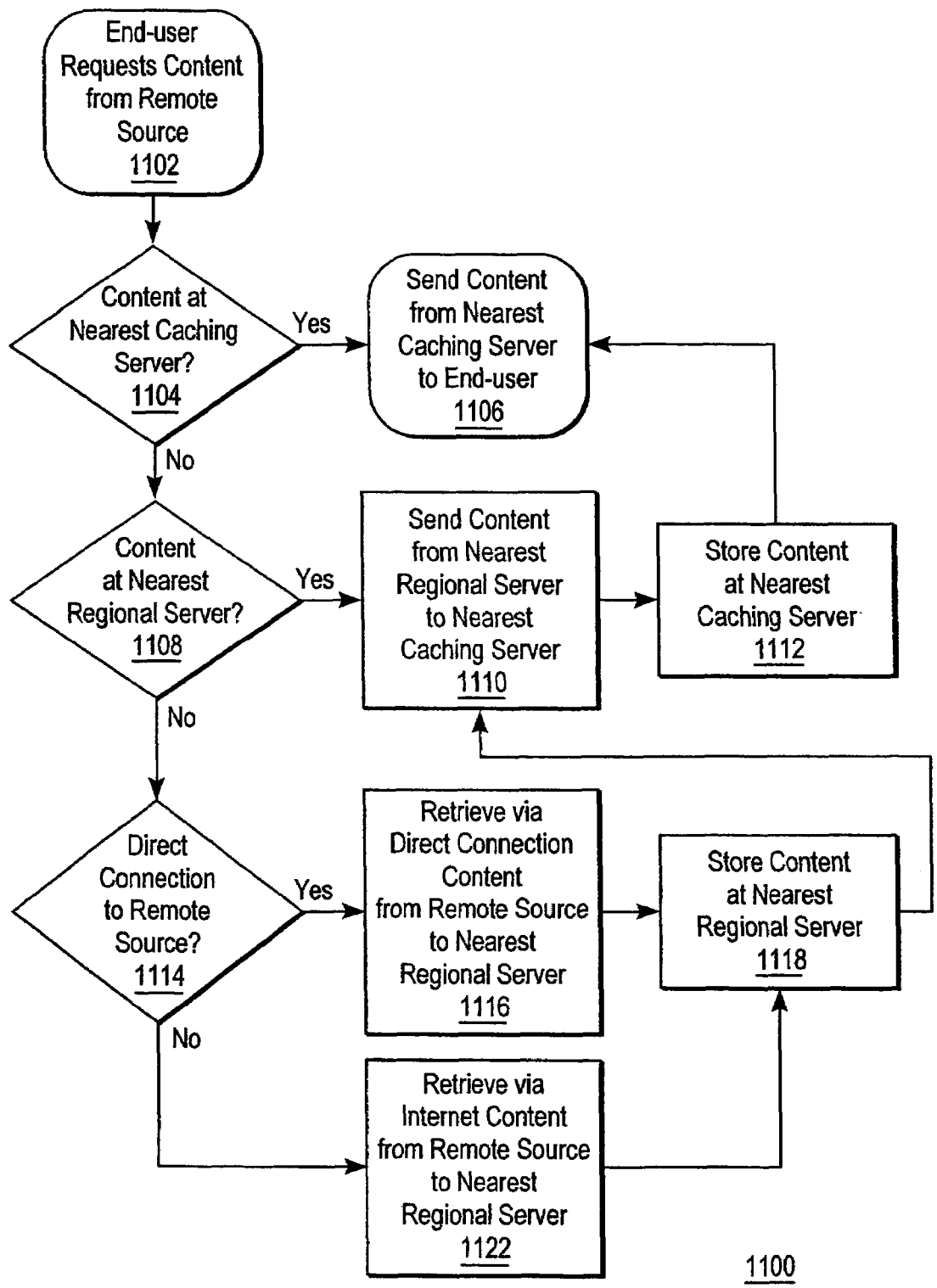
FIG. 11 is a flow diagram of a preferred method for providing data requested by a user to their system 124.

FIG. 11 is a flow diagram of a preferred method for providing data requested by a user to their system 124. The flow diagram illustrates the operation of a system with two levels of caching (a first level at the modified head-end 120 level and a second level at the RDC 118 level).

The process in FIG. 11 begins when an end-user system 124 requests 1102 content from a remote LAN source 114. This remote LAN source 114 may be, for example, the CNN WWW server, and the content may be a multimedia Web page from the CNN Web site. The following discussion will be in the context of multimedia content from CNN, but it applies to any data transfer across the Internet into a private network.

The caching server 402 at the "nearest" (i.e. most closely coupled) modified head-end 120 receives the request and determines 1104 whether or not the content requested is stored in its cache storage 616. If the content is stored in the cache 616, then the caching server 402 sends 1106 the content to the requesting end-user system 124. This first level of caching at the head-ends 120 more efficiently fulfills multiple requests for the same content by systems 124 served by the same head-end 120 because the often slow and unreliable Internet is bypassed for all but the first request from the locality served by the head-end 120.

Otherwise, the caching server 402 forwards the request to the regional server 302 at the "nearest" (i.e., most directly connected) regional data center 118. The regional server 302 determines 1108 whether the content is stored in its disk array 306. If the content is stored in the disk array 306, then the regional server 302 sends 1110 the content to the caching server 402 at the modified head-end 120 nearest to the end-user system 124. That nearest caching server 402 then stores 1112 the content in its cache 616, and sends 1106 the content to the requesting end-user 124. This second level of caching at the RDCs 118 more efficiently fulfills multiple requests for the same content by systems 124 served by the same RDC 118 because the often slow and unreliable Internet is bypassed for all but the first request from the region served by the RDC 118.

Otherwise, if the content is not stored in the disk array 306, then the regional server 302 determines 1114 whether the backbone 102 or a RDC 118 has a direct connection via a router 130 to the remote LAN source 114. If such a direct connection exists, then the regional server 302 retrieves 1116 via the direct connection the content from the remote source 114 and stores 1118 the content in its disk array 306. The regional server 302 may then send 1110 the content to the caching server 402 nearest the requesting end-user system 124. The caching server 402 then stores 1112 the content in its cache storage 616 and sends 1106 the content to the requesting end-user system 124. This direct retrieval of the content via the router 130 more efficiently fulfills requests for content because the often unreliable and slow Internet is always bypassed.

Otherwise, if a direct connection to the remote LAN source 114 does not exist, then the regional server 302 retrieves 1122 the content form the remote source 114 via the backbone 102, the NAPs 106, and the Internet 170. The regional server 302 may then send 1110 the content to the caching server 402 nearest the requesting end-user system 124. The caching server 402 then stores 1112 the content in its cache storage 616 and sends 1106 the content to the requesting end-user system 124.

Figure 12:
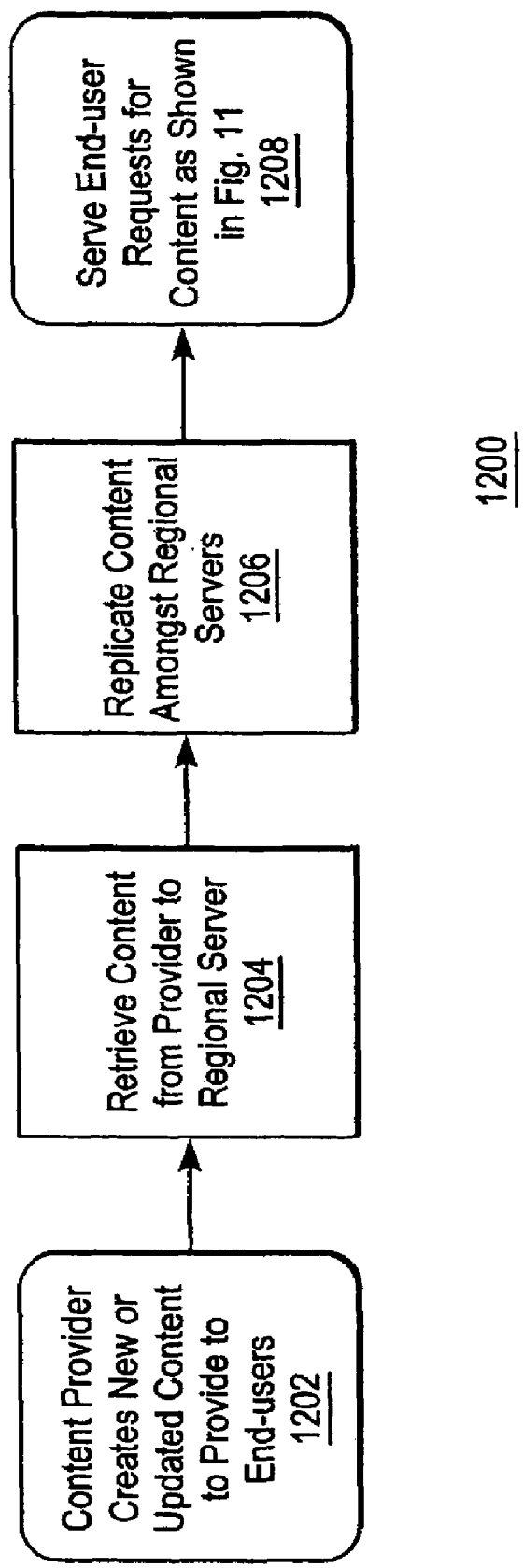
FIG. 12 is a flow diagram of a preferred method of replicating data from a content provider.

FIG. 12 is a flow diagram of a preferred method 1200 of replicating data from a content provider. Replication 1206 is used to efficiently and rapidly disseminate select content across the private network 180 to substantially decrease the latency experienced by the users of the end-users systems 124.

The process 1200 in FIG. 12 begins when a content provider creates 1202 new or updated content to provide to the end-user systems 124 of the private network 180. The content may be located on a LAN 114 of the content provider. For example, the content provider may be CNN and the content a headline story including text, an image, and video footage on the verdict in the O. J. Simpson trial. Again, the following discussion will be in the context of multimedia content from CNN, but it applies to any data transfer across the Internet to a private network.

The content is then retrieved 1204 from the content provider to a regional server 302. The retrieval 1204 may occur, for example, via the Internet 170 or a more direct connection (such as through a router 130).

Next, the content is replicated 1206 from the regional server 302 to other regional servers 302 in the private network 180. The replication is accomplished by the regional DDBMS software 518 in the regional computers 304. The content may be fully or partially replicated amongst the regional servers 302. In full replication, a full copy of the content would be kept at every regional server 302. In partial replication, either the copies replicated are not full (i.e. only a partial fragment of the full copy is replicated), or the copies are not distributed to every regional server 302. In our example, the headline story might be broken down into a text fragment, an image fragment, and a video fragment, and perhaps only the text and image fragments would be replicated amongst all the regional servers 302.

After replication 1206, the content is served 1208 to fulfill requests from the end-user systems 124, for example, by the process 1100 shown in FIG. 11. In this way, replication 1206 may be combined with caching to decrease the latency experienced by end-users of the network architecture 100.

Figure 13:
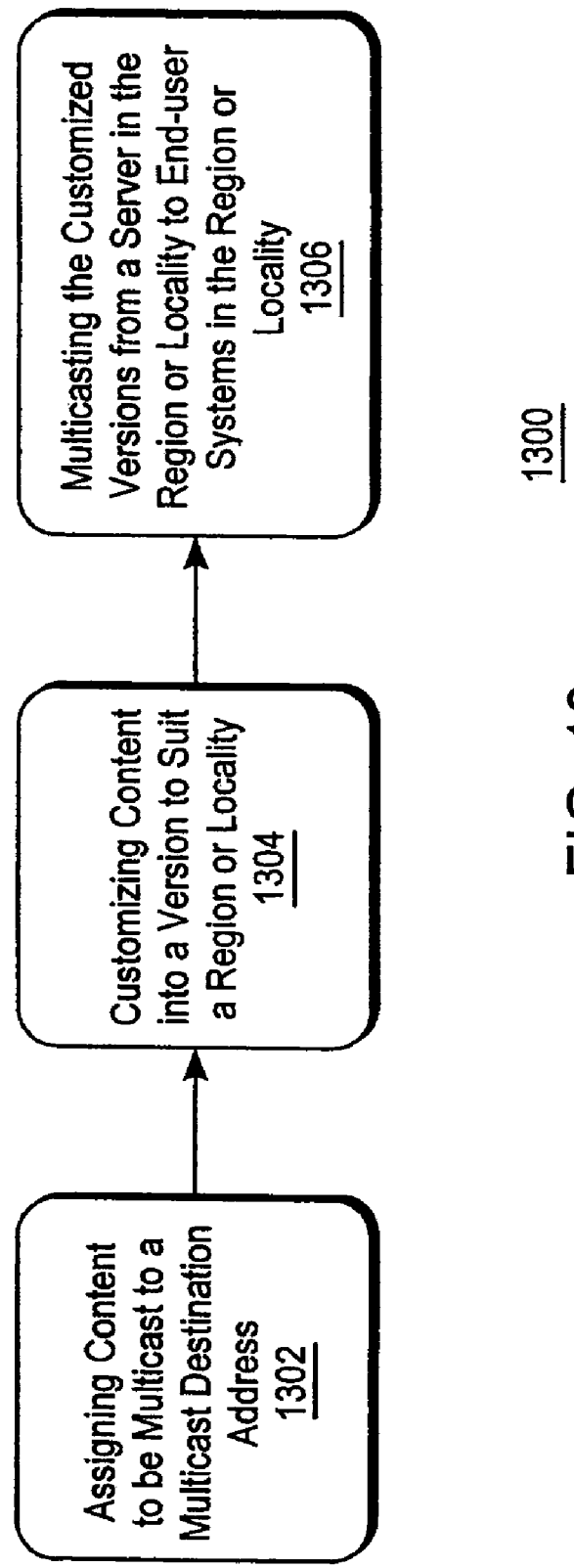
FIG. 13 is a flow diagram of a preferred method of multicasting content that is customized to region or locality.

FIG. 13 is a flow diagram of a preferred method 1300 of multicasting content that is customized to region or locality. Multicasting involves one-to-many broadcasting. IP multicasting permits one or a few sources to broadcast data to multiple receivers in a logical group.

Referring back to FIG. 1, the hierarchical nature of the private network 180 allows for multicasting in the network 180 to be customized by region (e.g., area covered by an RDC 118) or locality (e.g., area covered by a modified head-end 120) in an organized and efficient manner. For example, regional or local weather information may be efficiently multicast in this manner. End-user systems 124 in different regions or localities may "tune into" the same IP multicast address and obtain data which is customized to a particular region or locality.

The process 1300 in FIG. 13 begins by assigning 1302 the content to be multicast to an IP multicast destination address. Under currently used protocols, such addresses are generally "class D" IP addresses, i.e. their first 4 bits are set to 1110.

Next, the content is customized 1302 into a version to suit a region or locality. For example, if the content was today's weather forecast, the forecast may be customized for the region of the San Francisco Bay Area or for the locality of the city of Palo Alto.

The customized content is multicast 1304 from a server in each region or locality to end-user systems 124 within the region or locality. For example, the San Francisco Bay Area weather forecast may be multicast by the RDC 118 serving the Bay Area to systems 124 in the Bay Area that are "tuned into" the multicast, or the Palo Alto weather forecast may be multicast by a modified head-end 120 serving part of Palo Alto to systems 124 in Palo Alto that are "tuned into" the multicast.

The above description is included to illustrate the operation of the preferred embodiments and is not meant to limit the scope of the invention. The scope of the invention is to be limited only by the following claims. From the above discussion, many variations will be apparent to one skilled in the art that would yet be encompasses by the spirit and scope of the invention. For example, an optoelectronic node 122 in the HFC distribution system may be replaced by a router that connects to an ethernet hub of a LAN that covers an apartment building (multiple dwelling unit). As another example, the distribution infrastructure between the modified head-ends 120 and the end-user systems 124 may be implemented via xDSL (Asymmetrical Digital Subscriber Line, High bit-rate Digital Subscriber Line, or Symmetric Digital Subscriber Line) rather than a HFC distribution system. Furthermore, the connections and couplings described in the above specification need not be direct; rather, the connections and couplings may occur through various intermediate devices.

I claim:

1. A system for delivery of multimedia services comprising:
   a high-speed network backbone carrying content;
   at least two regional servers, coupled to the high-speed network backbone and including a first regional server and a second regional server which each provide a second level of caching for content received from the high-speed network backbone, the first regional server configured to customize content received from the high-speed network backbone to form a first version of multicast content and the second regional server configured to customize the content received from the high-speed network backbone to form a second version of multicast content; and
   a plurality of caching servers, including a first caching server coupled to the first regional server and a second caching server coupled to the second regional server, each caching server configured to provide a first level of caching of content for an end user system in a region served by the regional server to which it is coupled, and to provide the customized multicast content formed by the coupled regional server to the end-user system;
   wherein at least one of the caching servers is associated with a television head-end that provides television signals to the end user system in the region served by the regional server to which it is coupled.

2. The system of claim 1, wherein at least one of the regional servers comprises a cluster of highly-available servers.

3. The system of claim 1, wherein the content received from the high-speed network backbone comprises video content.

4. The system of claim 1, wherein the multicast content comprises multimedia content.

5. The system of claim 1, wherein the high-speed network backbone is coupled to the Internet.

6. The system of claim 1, wherein the multicast content comprises weather information and wherein each regional server customizes the weather information for the region served by the regional server.

7. A method for delivery of multimedia services comprising:
   providing a high-speed network backbone carrying content;
   providing at least two regional servers, coupled to the high-speed network backbone and including a first regional server and a second regional server which each provide a second level of caching for content received from the high-speed network backbone, the first regional server configured to customize content received from the high-speed network backbone to form a first version of multicast content and the second regional server configured to customize the content received from the high-speed network backbone to form a second version of multicast content; and
   providing a plurality of caching servers, including a first caching server coupled to the first regional server and a second caching server coupled to the second regional server, each caching server configured to provide a first level of caching of content for an end user system in a region served by the regional server to which it is coupled, and to provide the customized multicast content formed by the coupled regional server to the end-user system;
   wherein at least one of the caching servers is associated with a television head-end that provides television signals to the end user system in the region served by the regional server to which it is coupled.

8. The method of claim 7, wherein at least one of the regional servers comprises a cluster of highly-available servers.

9. The method of claim 7, wherein the content received from the high-speed backbone comprises video content.

10. The method of claim 7, wherein the multicast content comprises multimedia content.

11. The method of claim 7, wherein the high-speed network backbone is coupled to the Internet.

12. The method of claim 7, wherein the multicast content comprises weather information and wherein each regional server customizes the weather information for the region served by the regional server.

13. A system for delivery of multimedia services comprising:
   a first regional server coupled to a high-speed network backbone, the first regional server providing a second level of caching for content received from the high-speed network backbone and customizing the received content to form a first version of multicast content;
   a second regional server coupled to the high-speed network backbone, the second regional server providing a second level of caching for content received from the high-speed network backbone and customizing the received content to form a second version of multicast content;
   a first caching server coupled to the first regional server, the first caching server providing a first level of caching of content received from the first regional server and providing the first version of multicast content to an end-user system in a region served by the first regional server; and
   a second caching server coupled to the second regional server, the second caching server providing a first level of caching of content received from the second regional server and providing the second version of multicast content to an end-user system in a region served by the second regional server;

wherein the first caching server is associated with a television head-end that provides television signals to the end user system in the region served by the first regional server.

14. The system of claim 13, wherein the first regional server comprises a cluster of highly-available servers.

15. The system of claim 13, wherein the content received from the high-speed network backbone comprises video content.

16. The system of claim 13, wherein the multicast content comprises multimedia content.

17. The system of claim 13, wherein the multicast content comprises weather information and wherein each regional server customizes the weather information for the region served by the regional server.

* * * * *